United States Patent
Chen

(10) Patent No.: US 12,358,592 B2
(45) Date of Patent: Jul. 15, 2025

(54) BICYCLE DERAILLEUR

(71) Applicant: SRAM, LLC, Chicago, IL (US)

(72) Inventor: Alyssa Chen, San Diego, CA (US)

(73) Assignee: SRAM, LLC, Chicago, IL (US)

(*) Notice: Subject to any disclaimer, the term of this patent is extended or adjusted under 35 U.S.C. 154(b) by 4 days.

(21) Appl. No.: 17/546,525

(22) Filed: Dec. 9, 2021

(65) Prior Publication Data

US 2023/0182860 A1 Jun. 15, 2023

(51) Int. Cl.
*B62M 9/125* (2010.01)
*B62M 9/122* (2010.01)
*B62M 9/124* (2010.01)

(52) U.S. Cl.
CPC ............ *B62M 9/125* (2013.01); *B62M 9/122* (2013.01); *B62M 9/124* (2013.01); *B62M 2009/12406* (2013.01)

(58) Field of Classification Search
CPC ....... B62M 9/125; B62M 9/122; B62M 9/124
USPC .............................................. 474/80, 82, 81
See application file for complete search history.

(56) References Cited

U.S. PATENT DOCUMENTS

| | | | | |
|---|---|---|---|---|
| 5,919,106 A | * | 7/1999 | Ichida | B62K 25/02 474/82 |
| 6,293,883 B1 | * | 9/2001 | Ichida | B62K 25/02 474/82 |
| 6,350,212 B1 | * | 2/2002 | Campagnolo | B62M 9/126 474/82 |
| 7,396,304 B2 | * | 7/2008 | Shahana | B62M 9/125 474/82 |
| 7,572,199 B1 | * | 8/2009 | Calendrille, Jr. | B62M 9/125 474/82 |
| 8,186,919 B2 | * | 5/2012 | Blair | B21D 53/20 411/128 |
| 8,770,608 B1 | | 7/2014 | Chamberlain | |
| 8,870,693 B2 | * | 10/2014 | Shahana | B62M 9/121 474/82 |
| 9,475,547 B2 | * | 10/2016 | Jordan | B62M 9/1248 |
| 9,840,307 B2 | * | 12/2017 | Rosati | F16B 21/18 |
| 10,040,511 B2 | * | 8/2018 | Shipman | B62M 9/122 |
| 10,239,579 B2 | * | 3/2019 | Pasqua | B62M 9/122 |
| 10,384,743 B2 | | 8/2019 | Shipman et al. | |

(Continued)

FOREIGN PATENT DOCUMENTS

| | | |
|---|---|---|
| CN | 205034288 U | 2/2016 |
| CN | 108275241 | 7/2018 |

(Continued)

*Primary Examiner* — Henry Y Liu

(57) ABSTRACT

A bicycle derailleur includes a base member mountable to a bicycle frame and having first and second laterally spaced mounting portions defining first and second planes, and a space therebetween dimensioned to receive a portion of the bicycle frame. A first mounting arrangement defines a first pivot axis oriented at an acute angle relative to the first and second planes. A second mounting arrangement defines a second pivot axis parallel to the first pivot axis. A first link is pivotally connected to the first mounting arrangement and a second link is pivotally connected to the second mounting arrangement. A moveable member is pivotally connected to the first and second links. A battery may be mounted on the base member and electrically connected with a motor carried by the moveable member.

21 Claims, 21 Drawing Sheets

(56) References Cited

U.S. PATENT DOCUMENTS

| | | | |
|---|---|---|---|
| 10,435,110 B2* | 10/2019 | Calendrille | B62M 9/127 |
| 10,793,222 B1* | 10/2020 | Harris | B62M 9/1244 |
| 10,814,934 B2* | 10/2020 | Pasqua | B62M 9/126 |
| 10,870,464 B2* | 12/2020 | Braedt | B62M 9/128 |
| 10,981,626 B2* | 4/2021 | Braedt | B62M 9/12 |
| 11,098,787 B2* | 8/2021 | Ziegler | F16F 15/1292 |
| 11,161,568 B2* | 11/2021 | Nakamura | B62M 9/1242 |
| 11,364,972 B2* | 6/2022 | Chiang | B62M 9/125 |
| 11,472,509 B2* | 10/2022 | Sala | B62M 9/125 |
| 11,661,142 B2* | 5/2023 | Braedt | B62M 9/126 474/82 |
| 11,794,856 B2* | 10/2023 | Hamed | B62M 9/134 |
| 11,866,127 B2* | 1/2024 | Boehm | B62M 9/125 |
| 11,975,801 B2* | 5/2024 | Braedt | B62M 9/126 |
| 2011/0027039 A1* | 2/2011 | Blair | B21D 53/20 470/42 |
| 2015/0031483 A1* | 1/2015 | Yamaguchi | B62M 9/1242 474/80 |
| 2015/0275955 A1* | 10/2015 | Ekmedzic | F16B 39/108 411/221 |
| 2016/0039494 A1* | 2/2016 | Mikesell | B62K 3/02 474/82 |
| 2016/0152301 A1* | 6/2016 | Bortoli | B62M 9/132 474/82 |
| 2016/0167739 A1* | 6/2016 | Watarai | B62M 9/124 474/80 |
| 2016/0288878 A1* | 10/2016 | Shipman | B62M 9/122 |
| 2017/0268561 A1* | 9/2017 | Hess | F16B 39/24 |
| 2018/0186429 A1* | 7/2018 | Nakamura | B62M 9/124 |
| 2018/0265169 A1* | 9/2018 | Braedt | B62M 9/128 |
| 2018/0272096 A1* | 9/2018 | Rubin | A61M 39/10 |
| 2018/0281899 A1* | 10/2018 | Bernardele | B62M 9/1242 |
| 2019/0100280 A1* | 4/2019 | Brown | B62M 9/125 |
| 2019/0351971 A1 | 11/2019 | Dueweling et al. | |
| 2020/0298933 A1 | 9/2020 | Braedt | |
| 2020/0339220 A1* | 10/2020 | Boehm | B62M 9/122 |

FOREIGN PATENT DOCUMENTS

| | | |
|---|---|---|
| CN | 111846099 | 10/2020 |
| DE | 102010032721 | 1/2012 |
| TW | 202039303 | 11/2020 |
| TW | 202108443 | 3/2021 |

* cited by examiner

BICYCLE DERAILLEUR

FIELD OF THE DISCLOSURE

The present application generally relates to a bicycle derailleur, including for example and without limitation a bicycle rear derailleur.

BACKGROUND

Bicycle derailleurs are commonly incorporated into a drivetrain of a bicycle. The typical drivetrain also includes a crank assembly that is coupled to one or more drive sprockets. The crank assembly is operable to drive a chain that is routed or wrapped around one of the drive sprockets. The chain may also be routed to one of wheels of the bicycle, for example a rear wheel, wherein the chain may engage one or more driven sprockets. Derailleurs are provided as a part of the drivetrain. For example, one derailleur (e.g., front) may be located adjacent the one or more drive sprockets, while another derailleur (e.g., rear) may be located adjacent the driven sprockets, for example adjacent the rear wheel. The derailleur(s) may be actuated to selectively shift the chain of the drivetrain between the drive sprockets, and/or to selectively shift the chain between the one or more of the driven sprockets. Shifting of the bicycle chain from one drive sprocket to another, or from one driven sprocket to another, is done in order to change the gear ratio of the drivetrain. The rear derailleur may also apply a tension to the chain to take-up slack, as well as to maintain the desired tension, in the chain on the non-drive-side of the drivetrain.

Often, the rear derailleur is attached to a bicycle with a derailleur hanger, which is designed to break or bend when the rear derailleur is impacted so as to limit the damage to the frame. For example, the hanger is attached to the frame, and the derailleur is then rotatably attached to the hanger below the frame. The hanger typically includes a single flange connected and cantilevered from only one side of the frame, making it more susceptible to failure. More recently, bicycle frames have been developed to be extremely durable and sturdy, making it necessary and inconvenient to incorporate a separate hanger, which may require additional maintenance and repair. Moreover, the multitude of bicycle frame manufacturers may provide various shapes and instructions on attaching a derailleur hanger. This makes it inconvenient for riders to find the correct hanger when a replacement is needed.

Rear derailleurs commonly used on road bicycles are configured with linkages oriented at a slant, thereby allowing for a more compact and accurate geometry along the cassettes of the bicycle. At the same time, it may be desirable to incorporate a motor or electrical components into the rear derailleur so as to enable wireless shifting of the gears and/or various diagnostic tasks. The compact arrangement, in combination with the required space for a battery, may make it difficult to connect the rear derailleur directly to the bicycle frame without an intervening hanger while also maintaining proper alignment with the driven sprockets.

SUMMARY

In one aspect, one embodiment of a bicycle derailleur includes a base member mountable to a bicycle frame. The base member includes first and second laterally spaced mounting portions defining first and second parallel planes defining a space therebetween. The space is dimensioned to receive a portion of the bicycle frame. The first and second mounting portions further define a first rotation axis extending orthogonal to the first and second planes. The base member includes a first mounting arrangement defining a first pivot axis oriented at an acute angle relative to the first and second planes, and a second mounting arrangement defining a second pivot axis parallel to the first pivot axis. A first link is pivotally connected to the first mounting arrangement, while a second link is pivotally connected to the second mounting arrangement. A moveable member is pivotally connected to the first and second links.

In another aspect, one embodiment of a bicycle derailleur includes a base member mountable to a bicycle frame. The base member includes first and second laterally spaced mounting portions defining first and second parallel planes defining a space therebetween. The space is dimensioned to receive a portion of the bicycle frame, while the first and second mounting portions define a first rotation axis extending orthogonal to the first and second planes. The base includes a front face having a first mounting arrangement defining a first pivot axis oriented at an acute angle relative to both of the first and second planes and a second mounting arrangement defining a second pivot axis parallel to the first pivot axis. A rear face includes a battery mount having a centerline disposed between the first and second planes. A passage extends between the front and rear faces. A first link is pivotally connected to the first mounting arrangement and a second link is pivotally connected to the second mounting arrangement. A moveable member is pivotally connected to the first and second links, wherein the moveable member includes an electric motor. A wire electrically connects the battery mount and the electric motor, wherein the wire is disposed in the passage.

In another aspect, one embodiment of a bicycle derailleur may include a base member mountable to a bicycle frame, wherein the base member includes first and second laterally spaced mounting portions defining first and second parallel planes defining a space therebetween. The space is dimensioned to receive a portion of the bicycle frame. The first and second mounting portions define a laterally extending first rotation axis. The base member further includes a rear face and a front face having a first mounting arrangement defining a first pivot axis oriented at an acute angle relative to a first and second planes, a second mounting arrangement defining a second pivot axis parallel to the first pivot axis, and a cavity defined rearwardly of the first and second mounting arrangements. A first link is pivotally connected to the first mounting arrangement. A second link is pivotally connected to the second mounting arrangement. At least one of the first and second links includes a first end portion moveable in the cavity as the first and second links are pivoted relative to the first and second mounting arrangements. A moveable member is pivotally connected to the first and second links.

The various aspects and embodiments of the derailleur, and the methods for the use and assembly thereof, may provide significant advantages over other derailleurs and methods. For example and without limitation, the mounting portions provide for the derailleur to be mounted directly to a bicycle frame without an intervening hanger. At the same time, the derailleur is configured to provide for the links to be oriented at an acute angle relative to the mounting portions and/or a horizontal axis, even when the base member is configured with spaced apart mounting portions configured to be directly mounted on the bicycle frame. A battery mount and battery may also be incorporated into the derailleur. The spaced apart mounting portions provide a stable and secure platform, while accommodating the slanted links and supporting the battery in a compact arrangement below and between the mounting portions.

The foregoing paragraphs have been provided by way of general introduction and are not intended to limit the scope of the claims presented below. The various preferred embodiments, together with further advantages, will be best understood by reference to the following detailed description taken in conjunction with the accompanying drawings.

BRIEF DESCRIPTION OF THE DRAWINGS

Objects, features, and advantages of the present invention will become apparent upon reading the following description in conjunction with the drawing figures, in which.

DETAILED DESCRIPTION OF THE DISCLOSURE

Figure 1:
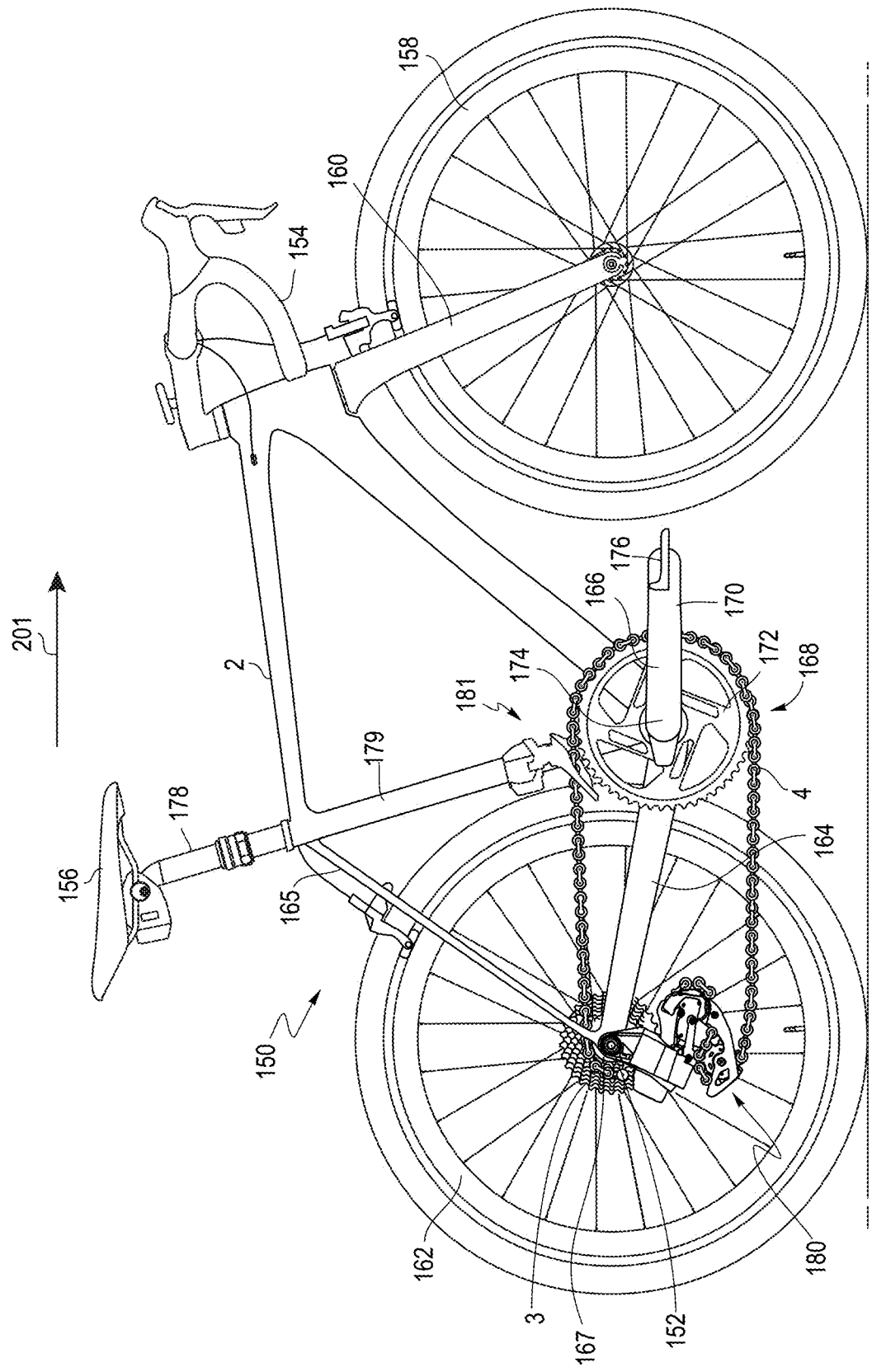
FIG. 1 is a side view of a bicycle assembled with a rear derailleur.
Figure 2A:
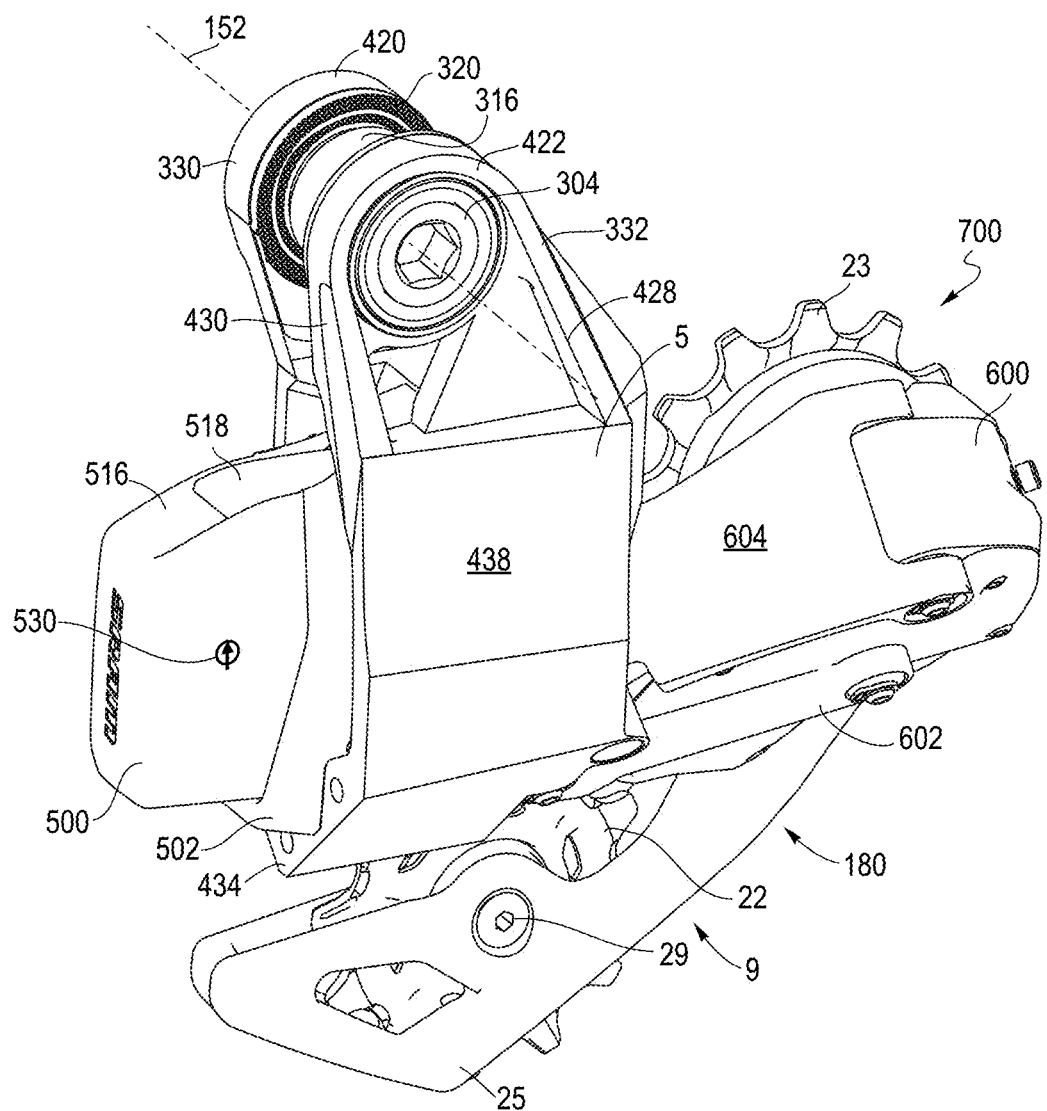
FIG. 2A is an outboard side, perspective view of one embodiment of a rear derailleur with a battery.
Figure 2B:
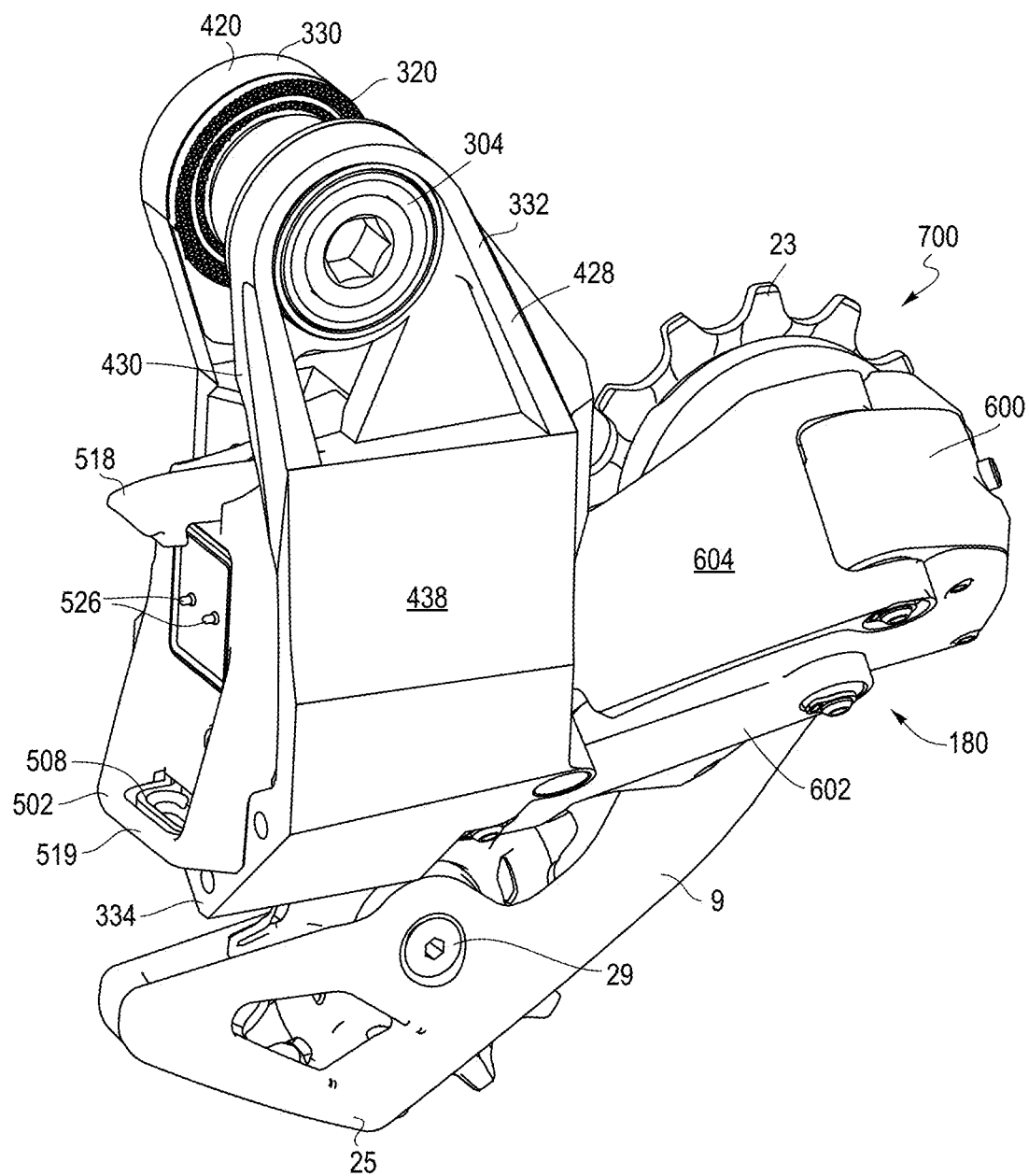
FIG. 2B is an outboard side, perspective view of one embodiment of a rear derailleur without a battery.
Figure 3:
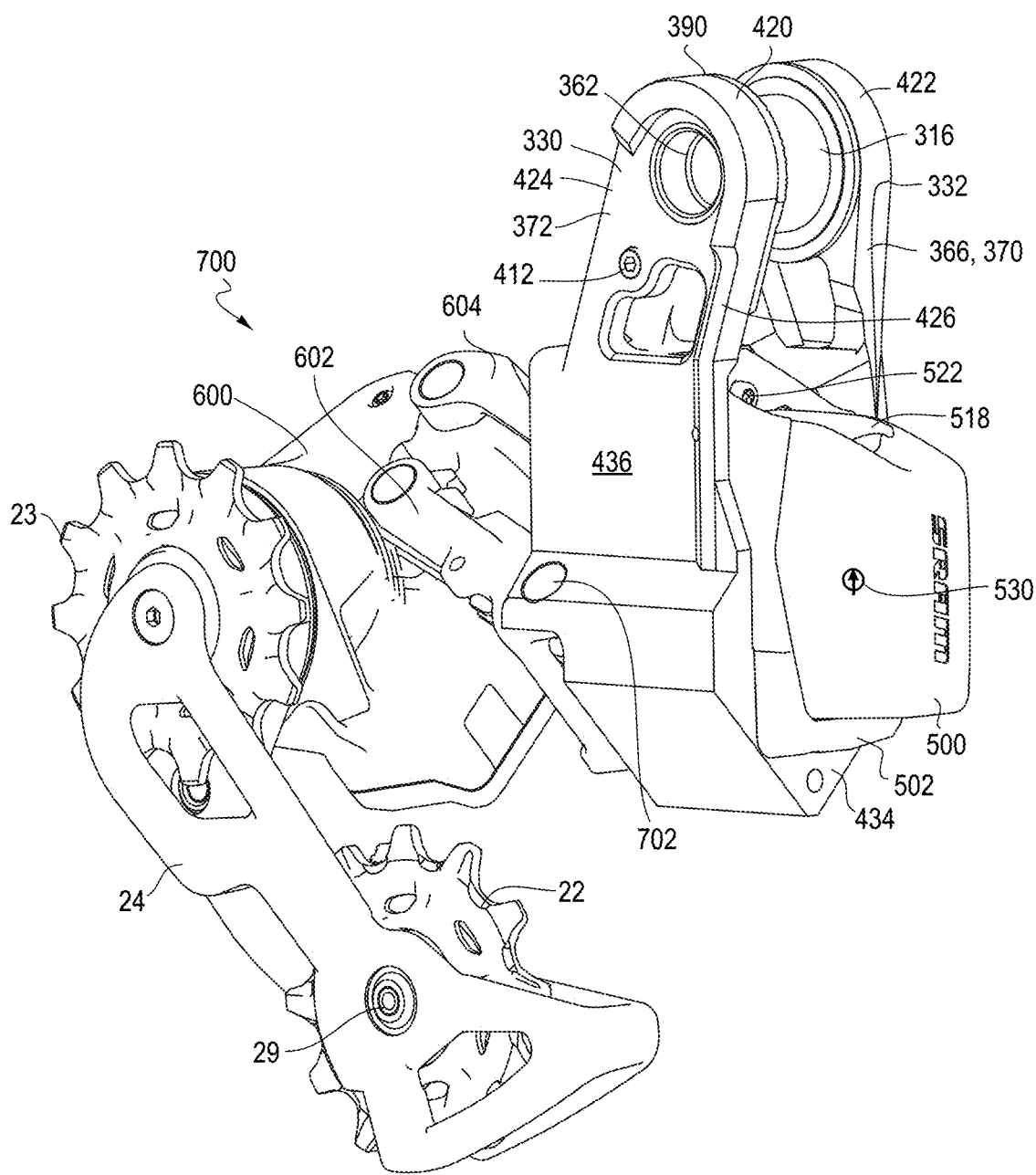
FIG. 3 inboard side, perspective view of one embodiment of a rear derailleur with a battery.
Figure 4:
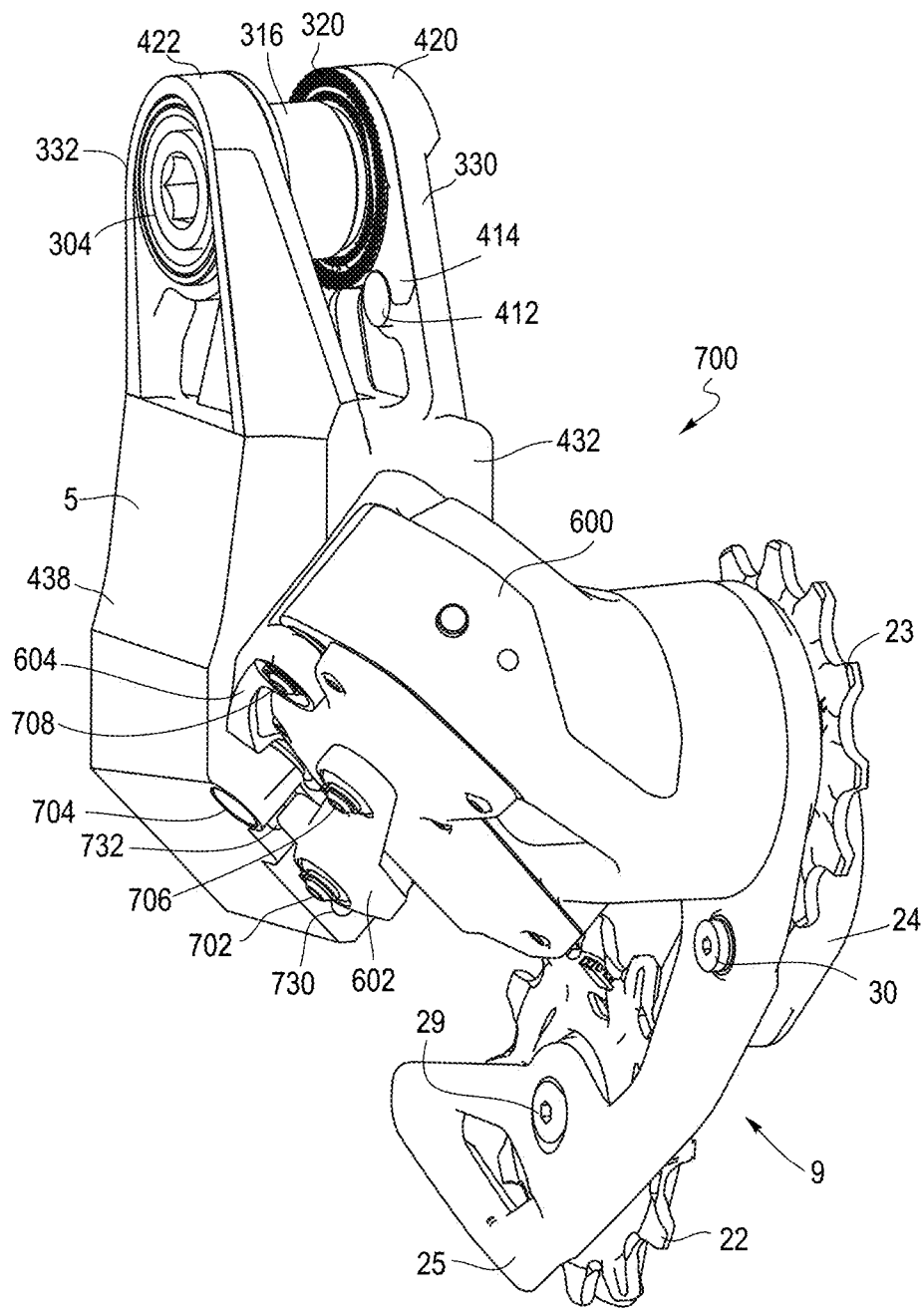
FIG. 4 is front perspective view of the rear derailleur shown in FIG. 2B.
Figure 5:
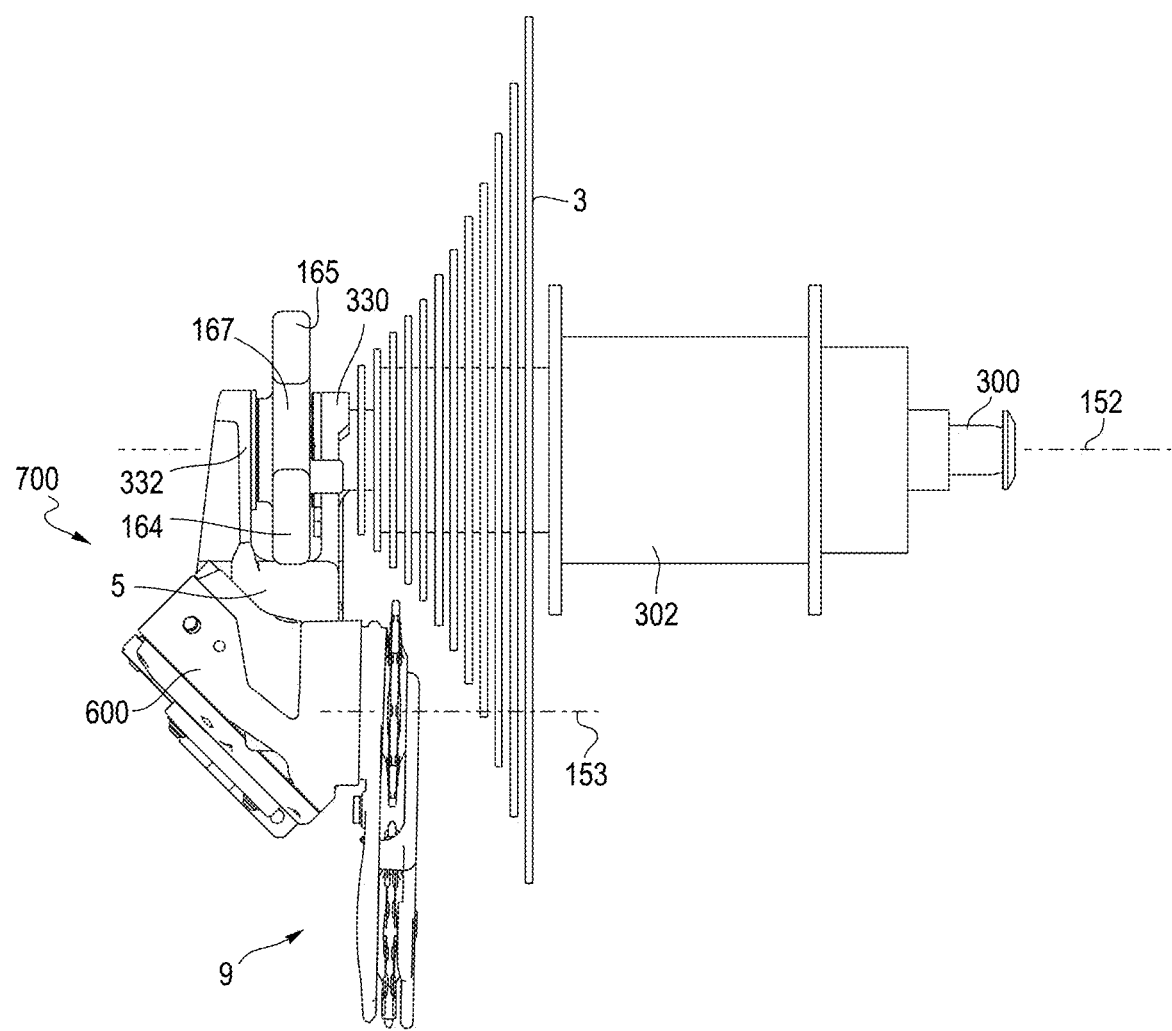
FIG. 5 is a partial front view of a rear derailleur coupled to bicycle frame.

It should be understood that the term "plurality," as used herein, means two or more. The term "longitudinal," as used herein means of or relating to a length or lengthwise direction. The term "lateral," as used herein, means situated on, directed toward or running in a side-to-side or axial direction 8. The term "coupled" means connected to or engaged with, whether directly or indirectly, for example with an intervening member, and does not require the engagement to be fixed or permanent, although it may be fixed or permanent. The terms "first," "second," and so on, as used herein are not meant to be assigned to a particular component so designated, but rather are simply referring to such components in the numerical order as addressed, meaning that a component designated as "first" may later be a "second" such component, depending on the order in which it is referred. It should also be understood that designation of "first" and "second" does not necessarily mean that the two components or values so designated are different, meaning for example a first direction may be the same as a second direction, with each simply being applicable to different components. The terms "upper," "lower," "rear," "front," "fore," "aft," "vertical," "horizontal," "right," "left," "inboard," "outboard" and variations or derivatives thereof, refer to the orientations of an exemplary bicycle 150, shown in FIG. 1, from the perspective of a user seated thereon, for example with an "inboard" component or feature being closer to a vertical mid-plane of the bicycle extending in a direction 201. The term "transverse" means non-parallel. The terms "outer" and "outwardly" refers to a direction or feature facing away from a centralized location, for example the phrases "radially outwardly," "radial direction" and/or derivatives thereof, refer to a feature diverging away from a centralized location, for example a rotation axis 152 of the cassette 3 as shown in FIGS. 1 and 5 or a midplane of a space defined by a derailleur. Conversely, the terms "inward" and "inwardly" refers to a direction facing toward the centralized or interior location. The term "subassembly" refers to an assembly of a plurality of components, with subassemblies capable of being further assembled into other subassemblies and/or a final assembly, such as the bicycle 150.

Figure 7:
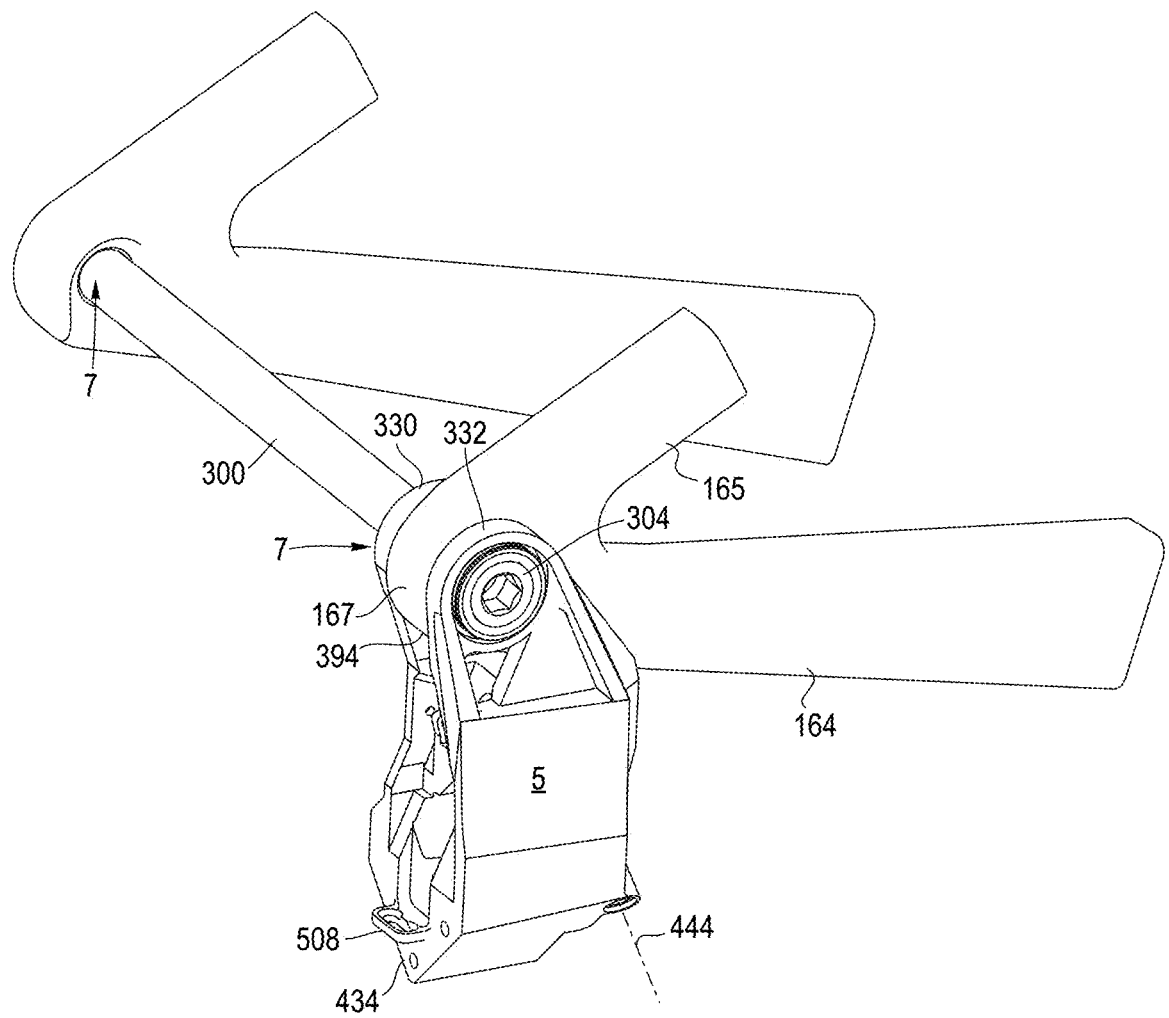
FIG. 7 is a partial side perspective view of a base member coupled to bicycle frame.

Bicycle:

FIG. 1 illustrates one example of a human powered vehicle. In this example, the vehicle is one possible type of bicycle 150, such as a road bicycle. The bicycle 150 has a frame 2, handlebars 154 near a front end of the frame 2, and a seat or saddle 156 for supporting a rider over a top of the frame 2. The bicycle 150 has a first or front wheel 158 carried by a front fork subassembly 160 supporting the front end of the frame 2. The bicycle 150 also has a second or rear wheel 162 supporting a rear end of the frame 2, which includes a pair of chain stays 164 connected to a pair of seat stays 165 at a junction or apex, otherwise referred to as a corner portion 167 of the frame 2, with the corner portion 167 having a through hole oriented along the axis 152 (see also FIGS. 5 and 7). The bicycle 150 also has a drive train 168 with a crank assembly 166 that is operatively coupled via a bicycle chain 4 to a rear cassette 3, otherwise referred to as a driven sprocket assembly, near the hub 302 providing a rotation axis of the rear wheel 162. The crank assembly 166 includes at least one, and typically two, crank arms 170 and pedals 176, along with a front chainring assembly 172, or drive sprocket assembly. A crank spindle or shaft may connect the two crank arms. The crank shaft defines a center rotational axis 174 of the chainring assembly 172. The crank assembly may also include other components.

A rear gear change device, such as a rear derailleur 180, is disposed at the rear wheel 162 to move the bicycle chain 4 to different sprockets of the cassette 3. In one embodiment, a front gear changer device, or front derailleur 181, may be provided to move the chain 4 to different sprockets of the chainring assembly. In the illustrated example, the saddle 156 is supported on a seat post 178 having an end portion received in a top of a frame seat tube 179 of the frame 2.

In FIG. 1, a normal riding or forward moving direction 201 of the bicycle 150 is shown. While the bicycle 150 depicted in FIG. 1 is a road bicycle, the rear gear change device, or rear derailleur 180, including the specific embodiments and examples disclosed herein as well as alternative embodiments and examples, may be implemented on other types of bicycles.

Referring to FIGS. 1-5, the rear derailleur 180 may include a cage assembly 9 moveably coupled to a base member 5. The cage assembly 9 is moveable in opposite first and second translation directions (e.g., inboard and outboard) relative to the base member 5. The cage assembly 9 may also be moveable in opposite first and second rotational directions (e.g., clockwise and counterclockwise rotation) about a laterally extending axis 153 relative to a moveable member 600 and the base member 5, or moveable relative to the base member 5 with a combination of translation and rotation. In particular, the cage assembly 9 is rotatably connected to the moveable member 600 with a fastener extending in a lateral direction and defining the rotation axis 153. The cage assembly may rotate clockwise around the axis 153 of the fastener to take up slack in the chain 4, which is engaged with the cassette 3, an upper chain pulley 23 and a lower chain pulley 22. The upper and lower chain pulleys 23, 22 are rotatably connected to the cage assembly 9. The cage assembly 9 may include one or both of an outer cage 24 secured to an inner cage 25, for example with fasteners 29, 30, configured as screws, a snap-fit, and/or other know suitable securing devices.

Base Member:

Referring to FIGS. 1-5 and 16, the rear derailleur 180 includes the base member 5, otherwise referred to as b-knuckle, which may be attached to the bicycle frame 2 with an adapter 310. In one embodiment, the adapter 310 includes a fastener, such as a bolt 304, threadably engaging a through axle 300 supporting the hub 302, the wheel 162 and the cassette 3 on the frame 2. The bolt 304 has interior thread engaged by the axle 300, when rotated in a counterclockwise direction in one embodiment. The bolt 304 extends through a bushing 312, which engages and is disposed in the hole 360 of the mounting portion 332. The bushing 312 supports the mounting portion 332 on the bolt 304. The bushing 312 may be made of a nonmetallic material to reduce any creaking noise. A washer 314, or axle stop, is non-rotatably engaged with a bushing 316 by way of raised portions received in recesses 318 formed around an inner circumferential periphery of the washer 314. The bushing 316 is mounted in the through opening of the corner portion of the frame. A nut 320 or washer is disposed at the end of the bushing and includes a flange defining a pair of stops 414 and a circumferential recess 416 therebetween. The bolt 304 is threadably engaged with the nut 320. A spring 322 biases the nut 320 away from the frame 2 when the bolt 304 is untightened. The nut 320 includes a knurled surface, which presses into the frame 2 when the bolt 304 is tightened and thereby fixes the angular position of the nut 320. The two protruding elements, or stops 414, on the nut 320 limit the range of angular movement of the base member 5 relative to the frame 2. The bolt 304, nut 320 and washer 314 are non-rotatable relative to the frame 2 once engaged with the through axle 300. The base member 5 is removeably coupled to the frame 2 with the adapter, but is free to pivot or rotate relative to the adapter 310 and frame 2 around about the axis 152.

Figure 10:
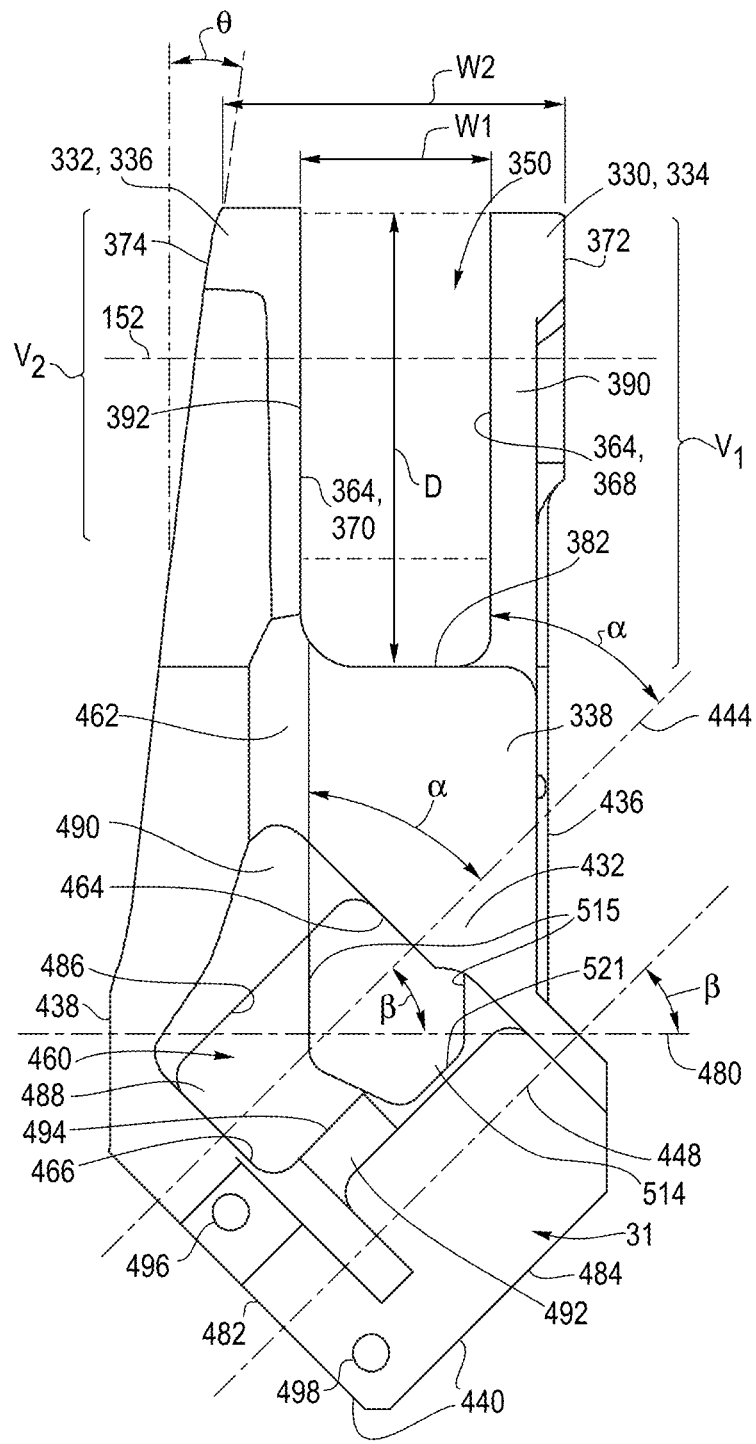
FIG. 10 is a front view of the base member shown in FIG. 8.
Figure 11:
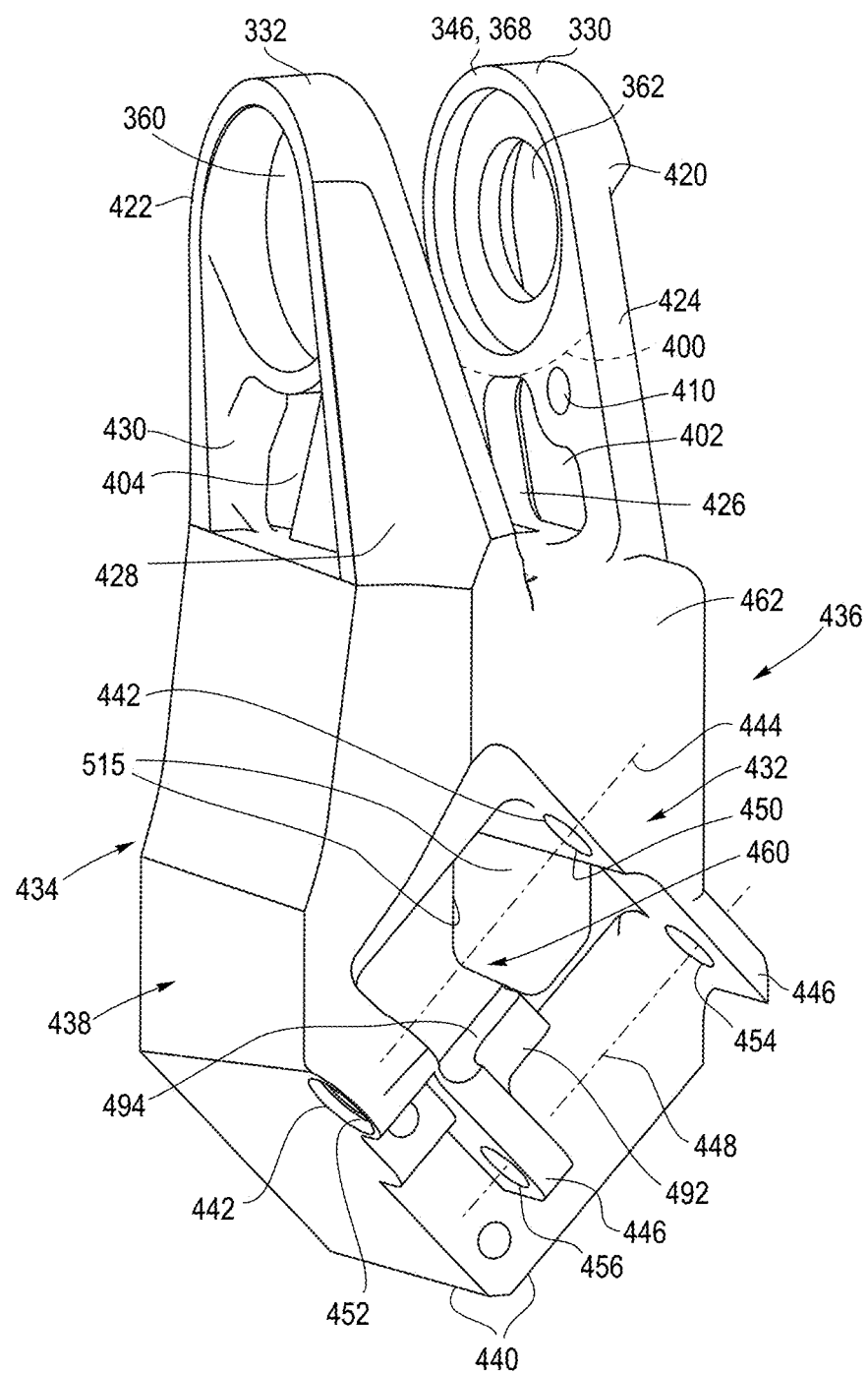
FIG. 11 is an outboard side perspective view of the base member shown in FIG. 8.

In one embodiment, and referring to FIGS. 2A-16, the base member 5 is configured with first and second mounting portions 330, 332 at a top connection end 21 of the base member. The mounting portions 330, 332 may be configured in one embodiment as first and second arms 334, 336 extending upwardly from a bottom, housing portion 338 of the base member 5. The mounting portions, or arms, are spaced apart from one another in a lateral, axial direction 8 and define a space 350 therebetween. As seen in FIG. 10, the space 350 has a width (W1) that is dimensioned to receive a portion of the bicycle frame 2, shown as the junction of the seat stay 165 and chain stay 164, or corner portion 167 of the frame 2. The first and second mounting portions 330, 332 each have openings 360, 362 that define in part the laterally extending rotation axis 152. In one embodiment, the rotation axis 152 has a horizontal orientation, for example when the bicycle is in an upright, riding position. The mounting portions 330, 332 each define a plane 364, 366 along a pair of opposing inner faces or surfaces 368, 370. In one embodiment, the planes 364, 366 and faces or surfaces 368, 370 have a vertical orientation, which are parallel. It should be understood that, in one embodiment, the faces or surfaces may not be parallel, or planar, but that the faces may still define a pair of parallel and/or vertical planes originating from, or lying tangent to, points on the faces that are spaced from each other. In this way, the surfaces still define theoretical parallel planes. The mounting portions 330, 332 also have outer faces, or surfaces 372, 374 facing outwardly away from each other in opposite directions, with the outer faces defining an overall width (W2) of the connection end. As shown in FIG. 10, for example, the outer surfaces may not be parallel, with the outer surface or face 372 lying in a vertical plane, while the outer surface or face 374 defines an angle θ relative to a vertical plane. In one embodiment, the mounting portions 330, 332, or arms 334, 336, of the base member 5 are disposed on opposite sides of a right frame corner portion 167 so that, in the mounted state, the first arm 334 is arranged on the inner side of the frame 2 and the second arm 336 is arranged on the outer side of the frame 2. The corner portions 167 of the frame 1 include a frame opening 7, which extends coaxially with the axis 152. In the mounted state, the bolt 304 passes both through the opening 360 in the arm 336 of the base member 20 and through the frame opening 7 and is threadably engaged with the axle 300.

As shown in FIGS. 6B-14, the first and second arms 334, 336 have predetermined first and second lengths (D), measured along the inner surface from a distal, or upper end, of each arm to a top surface 382 of the housing portion 338. The lengths (D) are sufficient to permit rotation of the base member 5 around the rotation axis 152 relative to the frame 2, and in particular the corner portion 167 thereof. The space 350 between the arms defines a first volume ($V_1$). Specifically, the first volume ($V_1$) is defined by the inner surfaces 368, 370, the top surface 382 of the housing portion and the perimeters 390, 392 of the arms. The space, or first volume, includes a second volume ($V_2$) which is shaped to match an outer perimeter 394 of a portion of the frame, or corner portion, that is disposed in and superimposed on the first volume. In other words, the overlap between the portion of the corner portion 167 and first volume ($V_1$) defines the second volume ($V_2$) over the entire rotation path of the base member 5 relative to the frame 2. The first volume $V_1$ is greater than the second volume $V_2$. Put another way, the inner surfaces 368, 370 each include a predetermined occupied area that is defined by a superimposed portion of the frame corner portion 167 when connected to the base member 5. The predetermined occupied area has a predetermined bottom boundary 400, which may run along the top of openings 402, 404 formed in or on the arms below the openings 360, 362. The boundary 400 is positioned above an upper surface of a battery 500 and battery holder 502, which are further described herein below, such that the battery 500 and battery holder 502 do not interfere with the rotation of the base member 5 relative to the frame 2.

The arm 334 has a cylindrical recess 406 formed along the inner surface thereof, and an rim portion 408 extending partially around the opening 362 on the outer surface. The opening 362 has a first diameter. An opening 410 is positioned in the arm 334 adjacent to the first opening 362. A stop 412 may be secured in the opening and extend inwardly into the space 350 between the mounting portions 330, 332. The stop 412 may be configured as a pin threadably engaged with the opening 410. The nut 320 is disposed in the recess 406, with the base member 5, or first mounting portion 330, being rotatable relative to the nut 320. The washer 320 is configured with the pair of circumferentially spaced stops 414, defining a recess 416 therebetween. The mounting portions 330, 332 may be rotated, or are rotatable, about the axis 152 relative to the nut 320 between an engaged position wherein the stop 412 is engaged with one of the stops 414 and a disengaged position wherein the 412 stop is disposed in the recess 416 and disengaged from both stops 414. The stops 414, and the spacing therebetween or length of the recess 416, limits the overall rotational travel of the base member 5 relative to the frame 2. In one embodiment, the stop 412 engages the front stop 414 during normal riding.

The opening 360 in the mounting portion 332 is larger than the opening 362 in the mounting portion 330. Both mounting portions may include other lightening openings 402, 404, which may be provided to reduce the overall weight of the base member and define in part the predetermined boundary 400. When configured with openings 402, 404, the mounting portions 330, 332 may each include a hub portion 420, 422 connected to the housing with a pair of upright portions 424, 426, 428, 430, which define the openings 402, 404 therebetween.

The housing 338 has a front face 432, a rear face 434, an inner side face 436, an outer side face 438 and a bottom face 440, or surface. The front face 432 may be configured with a first mounting arrangement 442 defining a first pivot axis 444 oriented at an acute angle α relative to the first and second planes, and also in one embodiment is oriented at an acute angle β relative to a horizontal plane 480. In various embodiments, the angles α and β are between and includes 30 and 60 degrees (e.g., with α being 30 degrees and β being 60 degrees in one embodiment). In one embodiment, the angle α is 45 degrees relative to the first and second planes, and the angle β also is 45 degrees relative to a horizontal plane. A second mounting arrangement 446 defines a second pivot axis 448 parallel to the first pivot axis. In one embodiment, the first mounting arrangement 442 includes spaced apart and coaxial openings 450, 452, or receptacles, and the second mounting arrangement 446 includes spaced apart and coaxial openings 454, 456. The openings may be formed in a surface of the housing, for example in a wall defining in part an interior cavity 460 of the housing, or in one or more lugs extending from a main body of the housing.

Figure 8:
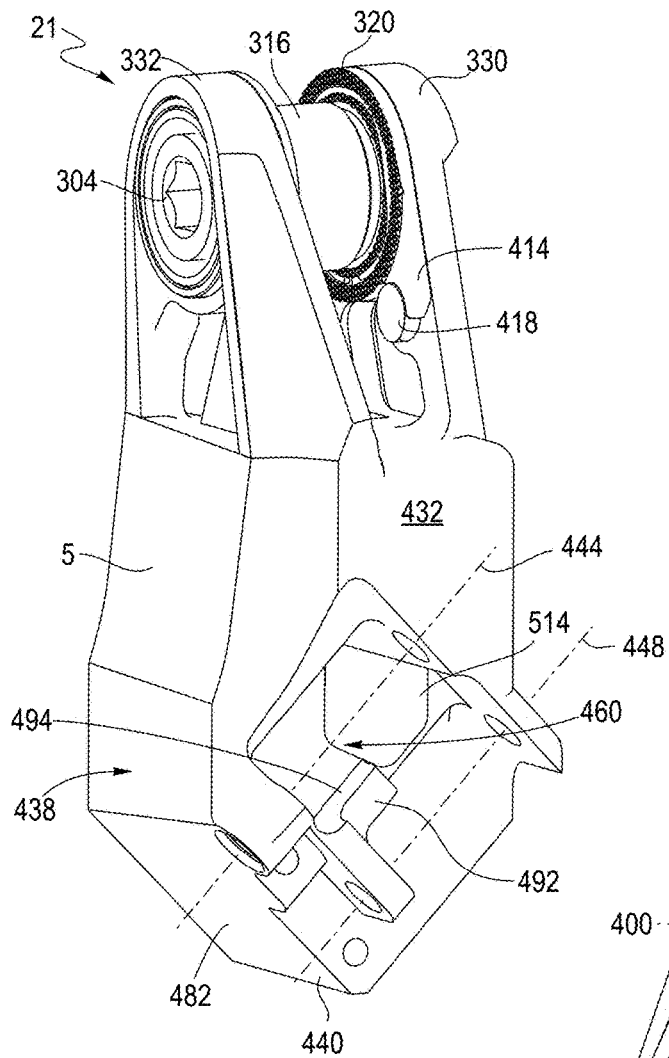
FIG. 8 is front perspective view of one embodiment of a base member.
Figure 9:
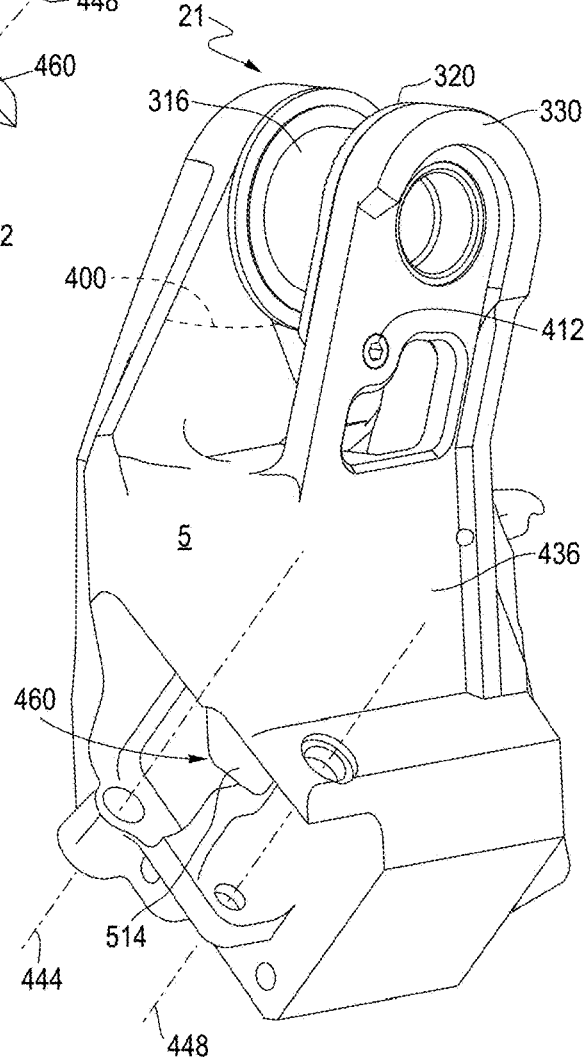
FIG. 9 is an inboard side perspective view of the base member shown in FIG. 8.

As shown in FIGS. 8-11, the interior cavity 460 extends rearwardly into the housing 338 from a forwardmost surface 462 of the front face 432. In one embodiment, the cavity has side walls 464, 466 that are formed or extend substantially perpendicular to the pivot axes 444, 448, or at an acute angle relative to the planes 364, 366 and also relative to a horizontal plane 480. The bottom surface 440 of the housing includes a first portion 482 formed perpendicular to the pivot axes 444, 448, or at an acute angle relative to the planes and the horizontal plane and a second portion 484 formed parallel to the pivot axes 444, 448, or at an acute angle relative to the horizontal plane, as shown in FIG. 10. Likewise, a top surface 486 of the cavity is formed parallel to the pivot axes 444, 448, or at an acute angle relative to the planes 364, 366 and the horizontal plane 480 and parallel to the second portion 484 of the bottom surface 440. In one embodiment, the cavity 460 has a rectangular cross-section, oriented at 45 degrees relative to vertical and horizontal planes. The cavity 460 includes a rear wall 488. A slanted surface 490 intersects and extends upwardly and outwardly from the top surface 486 of the cavity and intersects the front face 432. The slanted surface 490 is oriented at an angle relative to a vertical plane, and may be parallel to pivot axes 444, 448. Alternatively, the slanted surface 490 may not be parallel to the pivot axes 444, 448. As shown in FIGS. 8 and 10, a support platform 492 extends from cavity and has a support surface 494 oriented parallel to the pivot axes 444, 448. A pair of spaced apart limit holes 496, 498 are formed the front face and are aligned along an axis or plane extending perpendicular to the pivot axes 444, 448. Limit pins may be disposed in the limit holes, and may be extended or retracted so as to limit the rotation of a linkage mechanism, which is further described herein below.

Referring to FIGS. 10 and 12-14, the rear face 434 of the housing 338 includes an inner slanted rear surface portion 500, an outer, or perimeter vertical rear surface portion 501 and a pair of spaced apart lugs or mounting arrangement 504 defining a pivot axis 506, which may be horizontal in one embodiment. A lower support platform 508 extends rearwardly from the housing 338 in a cantilevered configuration. Upper and lower fastener openings 510, 512 extend forwardly into a rear surface of the rear face 434. As shown in FIGS. 8, 10, 12, 13 and 15, a passage 514 is formed between the front and rear faces 432, 434, and in particular communicates with the cavity 460. The passage 514 may include opposite side walls 515 having a vertical orientation and a bottom wall 521 having at least one portion oriented parallel to at least one of the portions 440.

A battery mount, or holder 502 includes a support housing 517 having a bottom portion 519 that fits over and surrounds the cantilevered support platform 508. A pair of fasteners 522, 524 secure the housing to the rear surface of the housing 338 at the openings 510, 512. The battery mount 502 includes a pair of rearwardly extending electrical contacts 526. A wire 128, or flexible electrical cable, is electrically coupled to the battery mount 502 and extends forwardly from a rear side of the battery mount 502 through the passage 514 and into/through the cavity 460. The wire has a connector 198 at a distal end of the wire, which may be electrically coupled with an electric motor 210, described in more detail below. The phrase "electrically coupled" or "electrically connected" refer to a direct connection, or an indirect connection, for example with an intervening component sch as a printed circuit board, which may control the operation of the motor 210. A latch 518, configured as a lever pivotally connected to the mounting arrangement 504, is secured to the base member 5 adjacent a top of the battery mount 502 with a pin or axle 523. A latch pin access hole 520 is provided in the base member to allow pin connecting the latch to be removed or released.

A battery 500 may be situated on, or hooked onto, the support platform 508 and rotated into electrical contact or connection with the electrical contacts 526. The latch 518 may be rotated downwardly into engagement with the battery 500 to secure the battery to the battery mount 502 and maintain the electrical connection with the electrical contacts 526. A top 516 of the battery 500, and the latch 518, are disposed outside the second volume, and below the frame corner portion 167 and predetermined boundary 400. The battery 500 has a center of gravity 530 disposed between the first and second planes 364, 366. In one embodiment, the battery 500 has an overall width (W3) that is disposed between the first and second planes 364, 366 as shown in FIG. 12.

In one example, the base member 5 may be manufactured with forging and machining, and the battery mount 502 may be manufactured with injection molding. The battery mount being made of plastic (e.g., glass filled nylon) reduces the weight, the cost, and the difficulty in manufacturing the base member. The base member 5 may be made of a metal, for example, aluminum. The base member 5 may be made of a first material, and the battery mount 502 may be made of a second material. The first material may be a different material than the second material. In other embodiments, the base member and battery mount may be integrally formed from the same material.

Figure 12:
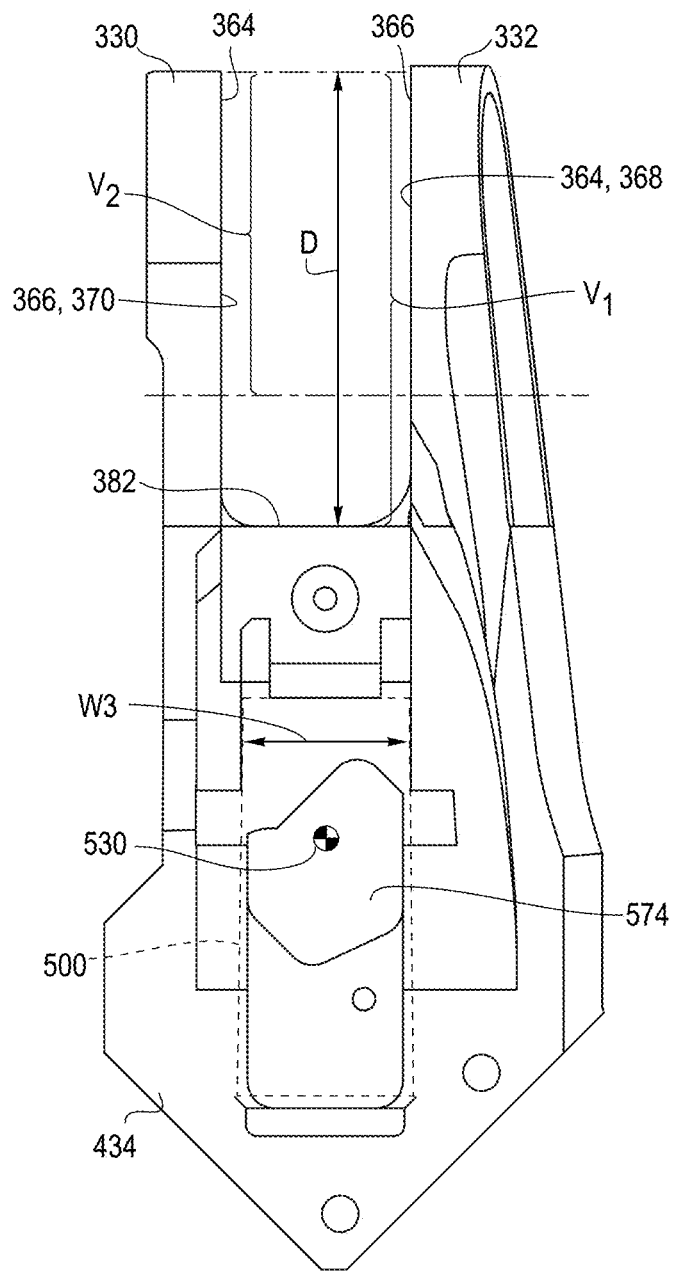
FIG. 12 is a rear view of the base member shown in FIG. 8.
Figure 13:
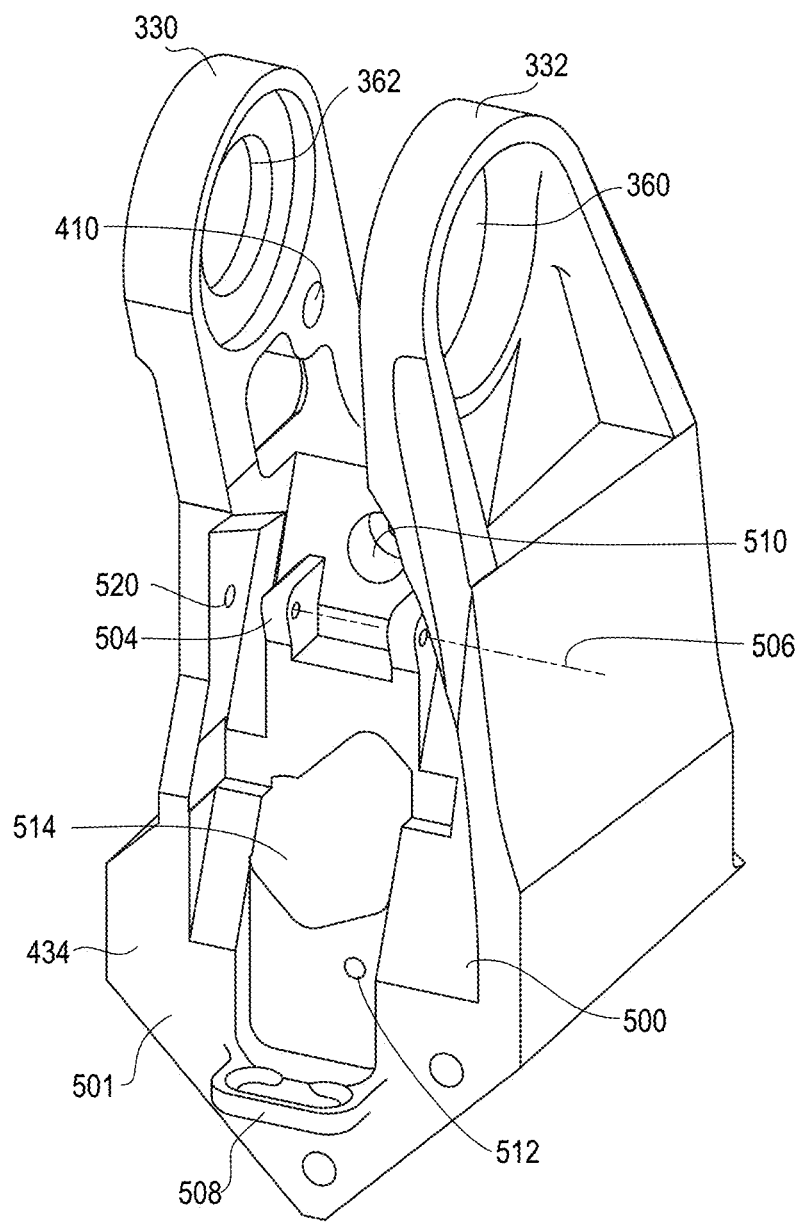
FIG. 13 is an outboard side perspective view of the base member shown in FIG. 8.
Figure 14:
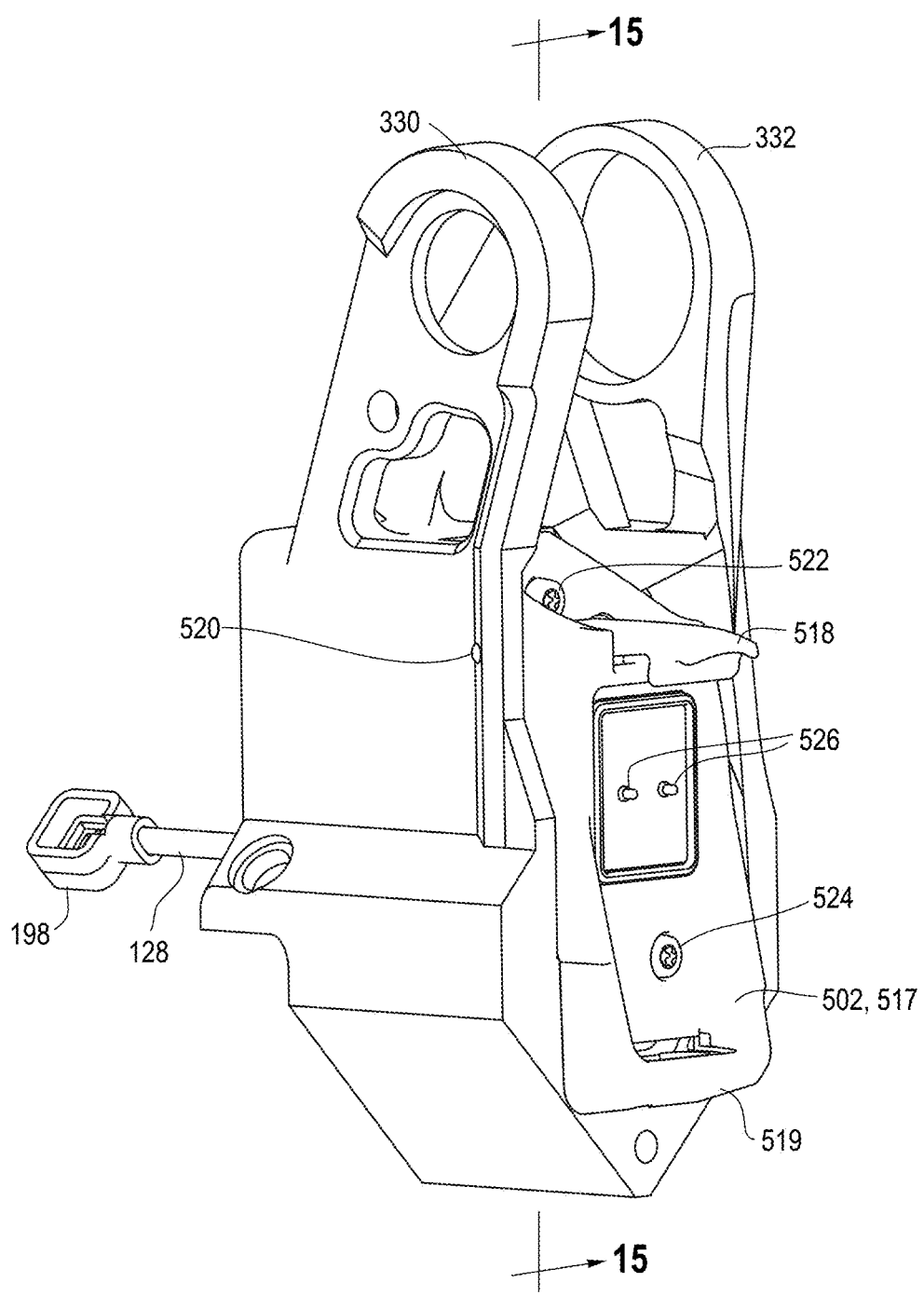
FIG. 14 is an inboard side perspective view of the base member shown in FIG. 8 with a wire coupled to the battery mount.
Figure 15:
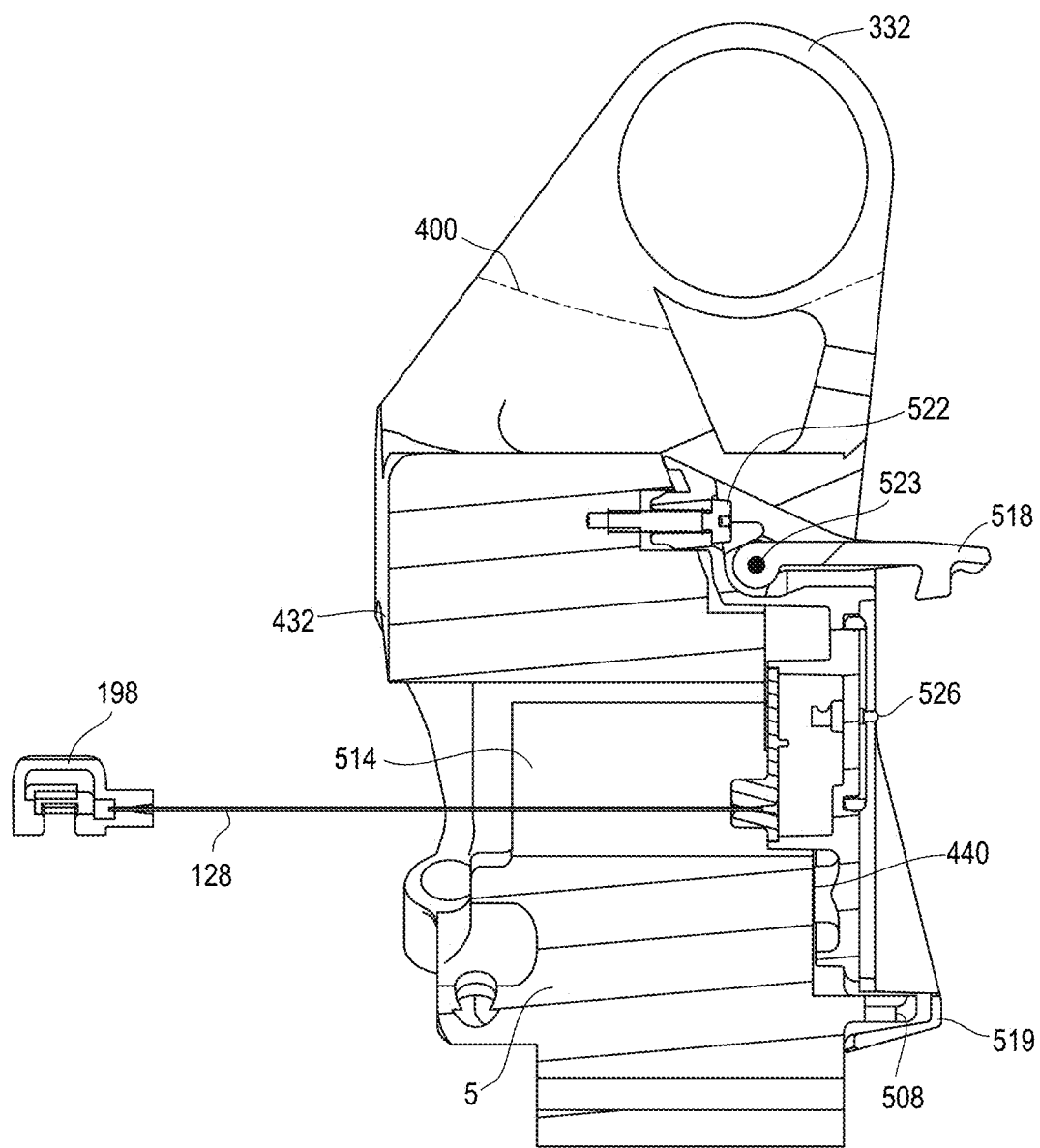
FIG. 15 is a cross-sectional view of the base member shown in FIG. 14 taken along line 15-15.
Figure 16:
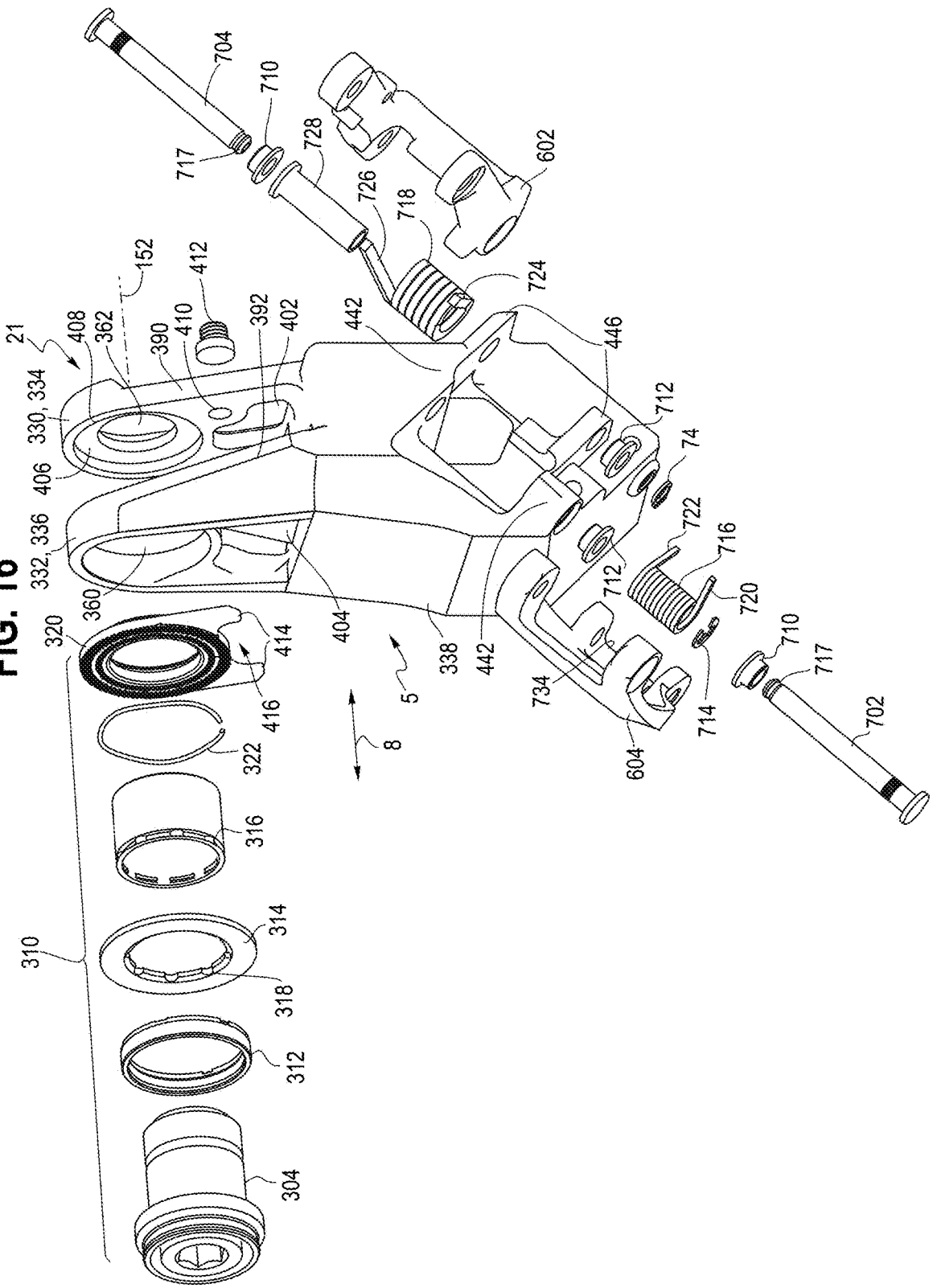
FIG. 16 is an exploded view of one embodiment of a base member and first and second links.

Referring to FIG. 12, the cable 128 electrically connects a power supply, such as the battery 500, which is electrically connectable at the battery mount 502 of the base member 5 to a component of the movable member 600. For example, as discussed further below, the cable 128 electrically connects the power supply 500 coupled to the base member 5 with a printed circuit board (PCB) 204 supported within the movable member 600. In other examples, the cable 128 may electrically connect the power supply with a component within the base member 5, one of the links 602, 604, or the chain guide assembly, or cage assembly 9, instead of the movable member 600. Other cables may be provided to electrically connect the power supply with components within the rear derailleur in addition to or instead of the cable 128 electrically connecting the power supply and the PCB of the movable member 600.

Figure 6A:
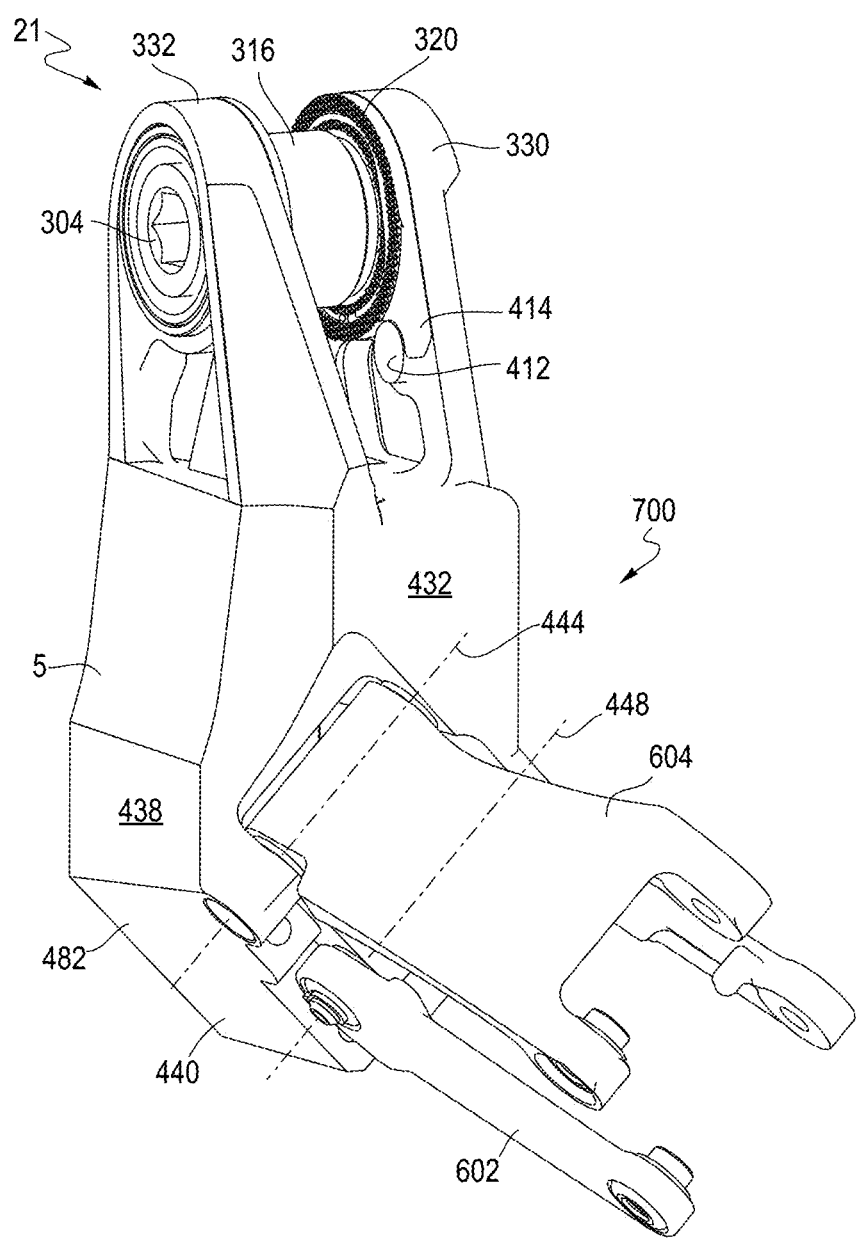
FIG. 6A is a front perspective view of a base member with a pair of links pivotally connected thereto.
Figure 6B:
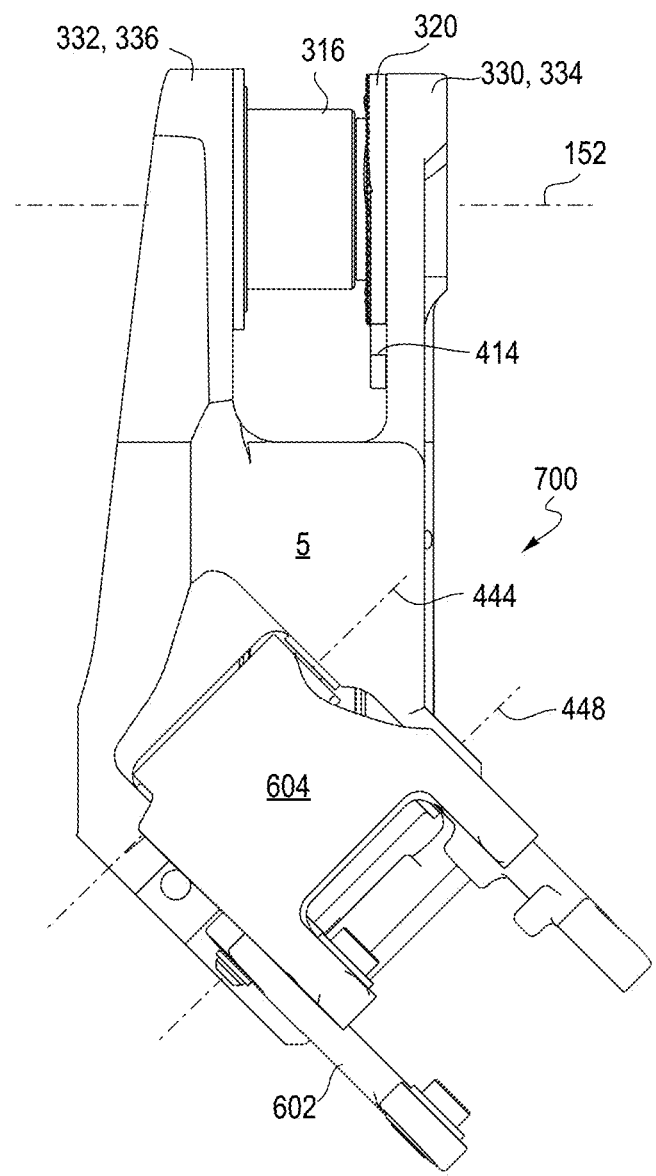
FIG. 6B is a front view of the base member and link shown in FIG. 6A.

Linkage:

Referring to FIGS. 2A-6B and 10, the base member 5 is coupled at a second, bottom connection end 31 with a pivot mechanism 700, which defines a four-bar linkage including the base member 5, one or more links 602, 604 and the moveable member 600. In one embodiment, the pivot mechanism 700 is configured as a parallelogram linkage configured with the first link 602, or inner pivot arm, the second link 604, or outer pivot arm, and four pivot pins 702, 704, 706, 708, otherwise referred to as axles. First and second pivot pins 702, 704 are mounted to the first and second mounting arrangements 442, 446 and define the pivot axes 444, 448. The pins are secured in the mounting arrangements with ends caps 710, 712 and a clip 714 that engages a circumferential groove 717 on the pin 702, 704. At least a portion of each of the first and second pins 702, 704 are disposed between the first and second planes 364, 366 as shown in FIG. 6B. In one embodiment, at least one face, or inner boundary or surface, of each of the mounting arrangements 442, 446 is disposed between the first and second planes 364, 366. In this way, the load applied by the links 602, 604 to the base member 5 may be carried by the mounting portions 330, 332 and transmitted to the frame 2 without creating a moment arm.

A torsion biasing spring 716 is coaxially mounted on the first pin 702, while a torsion clutch spring 718 is coaxially mounted on the second pin 704. A bushing 728 may be disposed between the second pin 704 and clutch spring 718. A first end of the first link 602, or inner pivot arm, is pivotally connected to the mounting arrangement 446, or base member 5 with the pivot pin 704, while a first end of the second link 604, or outer pivot arm is pivotally secured to the mounting arrangement 442, or base member 5 with the pivot pin 702. A first leg 722 of the biasing spring engages the upper pivot arm or link 604, while a second leg 720 engages the surface 494 of the support platform 492. Likewise, a first leg 724 of the clutch spring engages the lower pivot arm, while a second leg 726 engages a front surface of the housing. Limit screws 730, 732 may be positioned in the limit screw holes, and extended or retracted to limit the rotational travel of the linkage. An end portion 734 of the second link 604, or outer pivot arm, is moveable in the cavity 460 as the first and second links 602, 604 are pivotable relative to the first and second mounting arrangements. In other embodiments, an end portion of the link 602 also may be moveable in the cavity 460. The top surface 486, side walls 464, 466 and rear wall 488 are dimensioned and spaced relative to the axis 444 so as to provide for and allow rotation of the end portion 734 inside the cavity 460.

Moveable Member:

The moveable member 600, otherwise referred to as a P-Knuckle, is pivotably connected to the second ends of the first and second links 602 604 with axles or pins 706, 708. The moveable member 600 may be configured with an electric motor 210, which is coupled with one or both of the first and second links 602, 604 to pivot the links and moveable member 600 relative to the base member 5.

Figure 17:
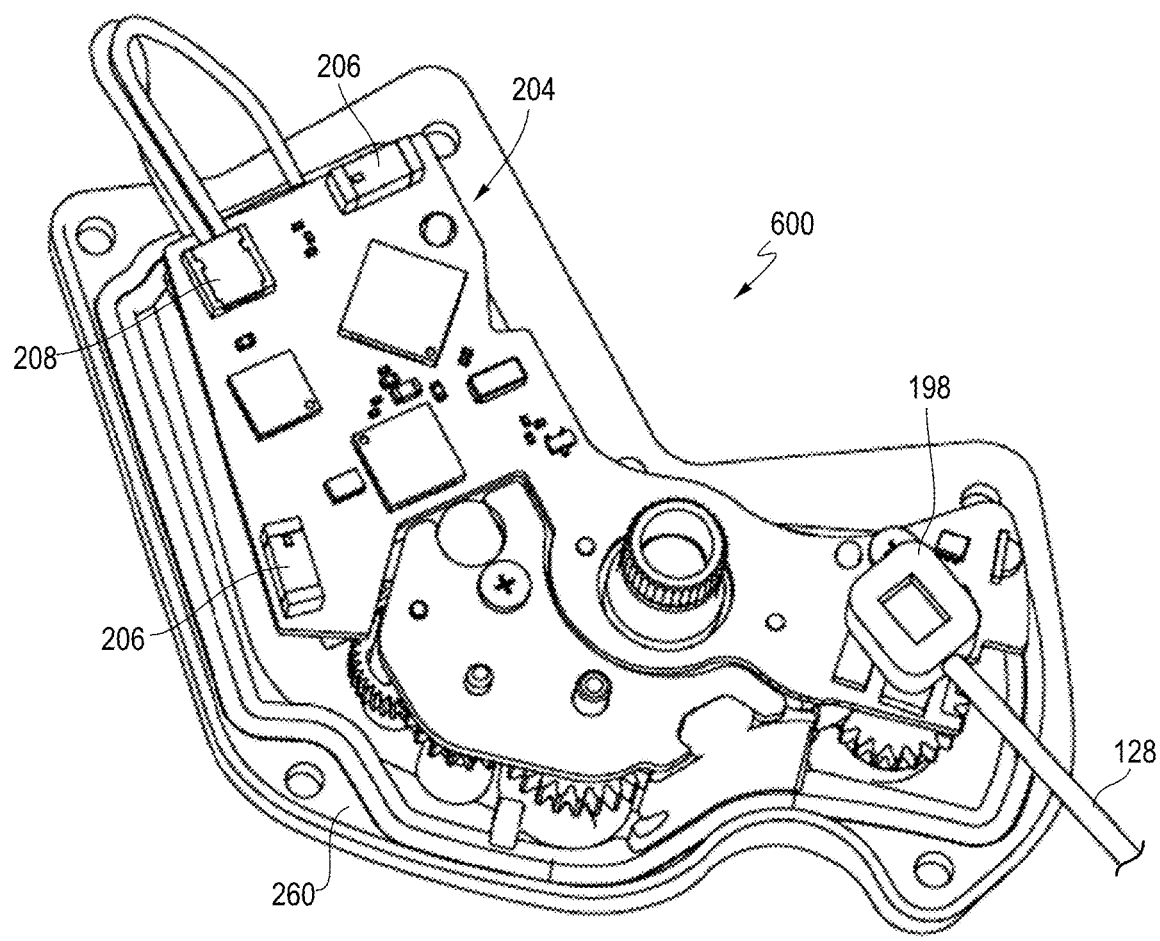
FIG. 17 is a perspective view of one example of a printed circuit board (PCB) supported within a portion of a movable member, with a cable connected to the PCB.
Figure 18:
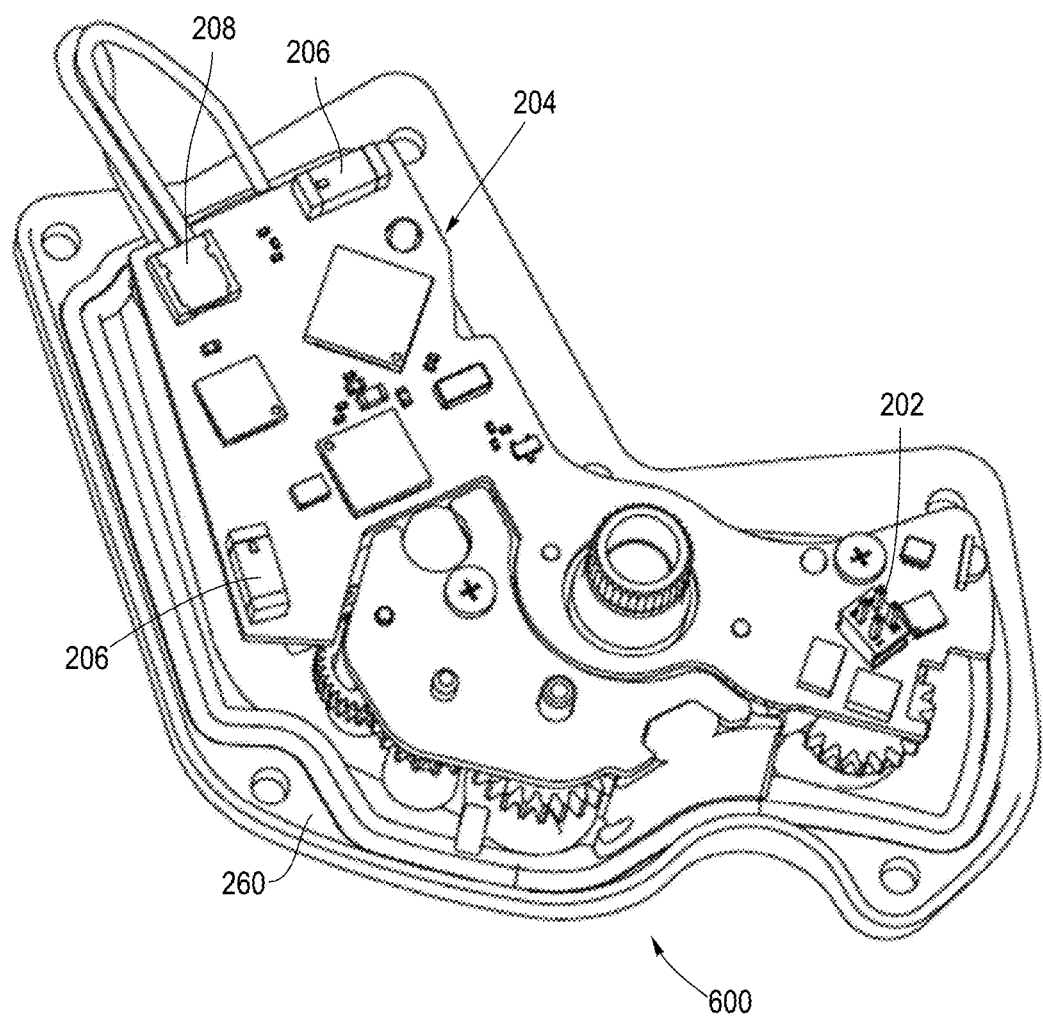
FIG. 18 is a perspective view of the PCB and moveable member portion of FIG. 17, without the cable connected to the PCB.

With reference to FIGS. 17-20, the movable member 600 includes a cover 200 attached to a body of the movable member 600. The cover 200 helps retain the cable 128 and helps prevent water and debris from reaching the connection between the connector 198 and a component of the movable member 600. Further, in the displayed embodiment, the moveable member 90 includes a drive arm 203 which transfers the force of the gear-train to the linkage to move the moveable member With reference to FIGS. 17 and 18, the connector 198 may be connected to a corresponding connector 202 on the PCB 204 housed within the movable member 600. The power supply, e.g. battery 500, powers components electrically connected to the PCB 204 via the electrical contacts 526, or pins, the cable 128, the connector 198, and the connector 202 when the power supply 500 is installed on the base member 5. The PCB 204 supports and/or the power supply 500 powers any number of components within the movable member 600. For example, as shown in the examples of FIGS. 17 and 18, the PCB 204 supports one or more antennas 206 (e.g., two antennas), and via a motor connection 208 electrically connecting two different sides of the PCB 204, the power supply 500 powers a motor. The PCB 204 may support and/or the power supply 500 may power additional, fewer, or different components.

Figure 19:
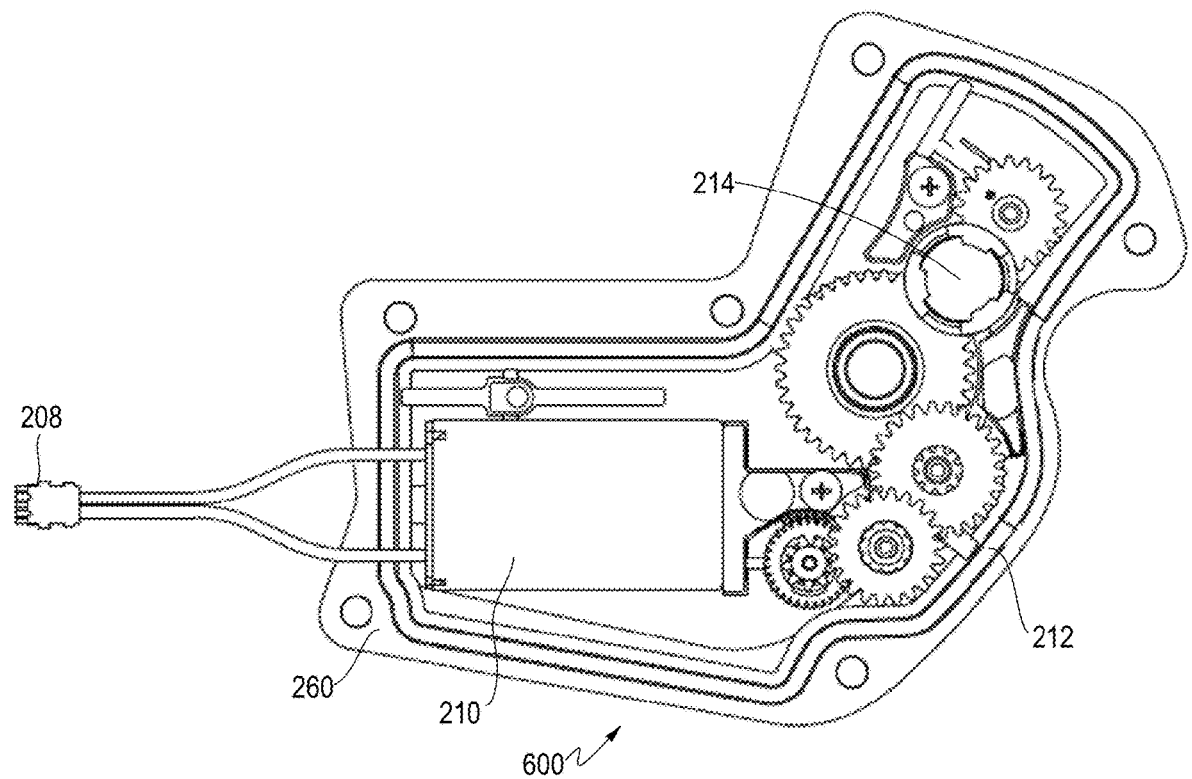
FIG. 19 is a side view of one example of a gear train and motor supported within a portion of the movable member.
Figure 20:
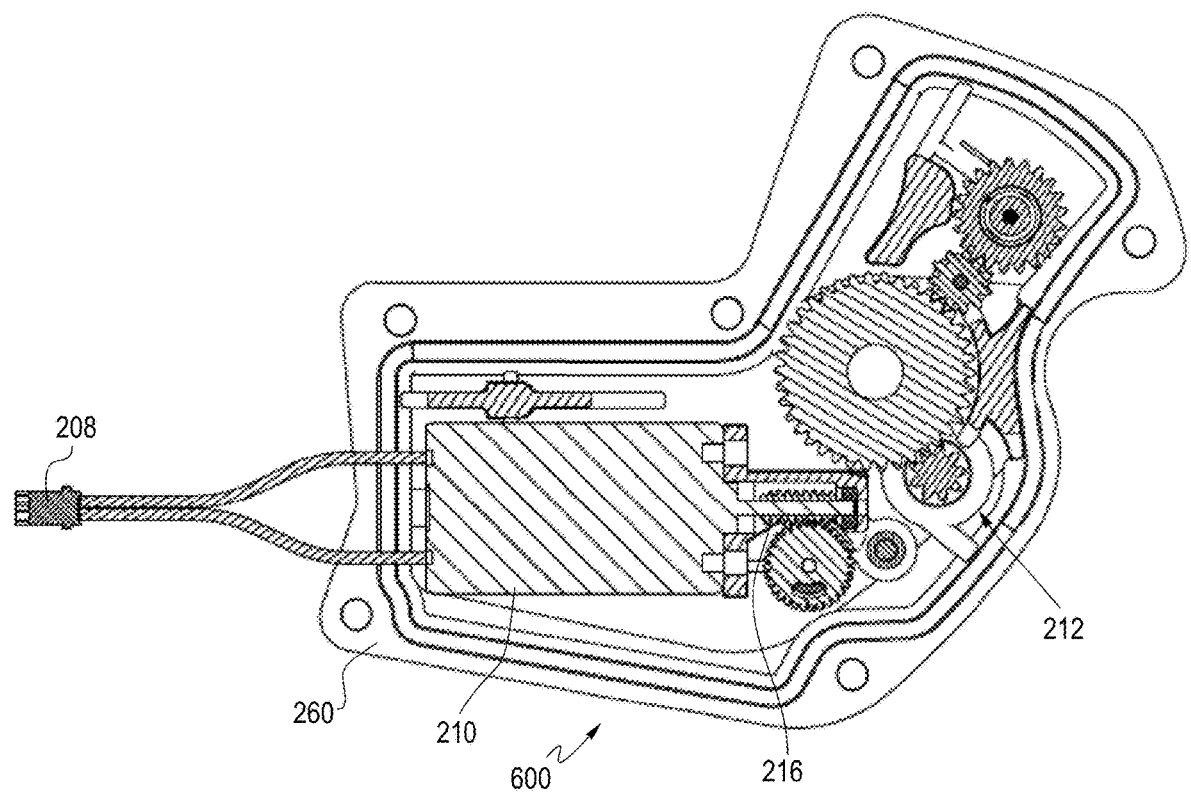
FIG. 20 is a section view through gear train and motor components of FIG. 19 supported by the portion of the movable member.

With reference to FIGS. 19 and 20, the movable member 600 may include, for example, a motor 210, a drive train 212, and an encoder 214 supported by and electrically connected via the PCB 204. The power supply 500 powers the motor 210 and drives the drive train 212 via an output worm gear 216. The powered motor 210 drives the drive train 212 to move the moveable member, which in turn moves the chain 4 between different sprockets.

In an embodiment, the gear changer or derailleur may include a mounting portion mountable to a bicycle frame, an electrical portion attached to the mounting portion and including power supply alignment and attachment features, and an electrical cable electrically connected to the electrical portion and electrically connectable to a printed circuit board (PCB) of a movable member movably coupleable to the mounting portion. The mounting portion and the electrical portion may be formed of different materials. The electrical portion may have a first side and a second side, the second side being opposite the first side. The first side of the electrical portion may be attached to the mounting portion. The electrical portion may include a recess at the second side. The recess may form the alignment features.

In an embodiment, the derailleur may also include at least one electrical contact electrically connected to the electrical cable, the at least one electrical contact extending at least partially through the electrical portion. The at least one electrical contact may be electrically connectable with the power supply when the power supply is positioned within the recess of the electrical portion.

In an embodiment, the mounting portion may be formed of aluminum and the electrical portion may be formed of a plastic.

In an embodiment, the derailleur may also include a power supply retaining member rotatably attached to the electrical portion. The derailleur may also include a protrusion extending away from a surface of the electrical portion. The power supply retaining member may be rotatable between a first rotational position relative to the electrical portion and a second rotational position relative to the electrical portion. The power supply retaining member and the protrusion may form the attachment features. The protrusion may be formed on the mounting portion.

In an embodiment, the electrical portion may be disposed rearward of the mounting portion relative to a forward direction of the bicycle.

In an embodiment, the electrical cable may extend through a passage of the mounting portion.

In an embodiment, the derailleur may also include a moveable member and a linkage. The linkage may be attached to the mounting portion and operable to facilitate movement of the moveable member relative to the mounting portion. The derailleur may also include a power supply mounted to the electrical portion with the alignment and attachment features. The derailleur may also include a motor operable to cause the movement of the moveable member. The power supply may provide power to the motor through the electrical cable. The motor may be disposed on the moveable member. The derailleur may also include a cage rotatably attached to the moveable member configured to engage and maintain tension in a chain of the bicycle. The derailleur may also include a damper disposed on the moveable member and configured to resist the rotation of the cage. The derailleur may also include a biasing member configured to bias the cage in a rotational direction of the cage.

In an embodiment, the PCB includes a wireless communication device for receiving wireless signals to control the motor.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations and/or acts are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that any described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

Although embodiments have been described for illustrative purposes, those skilled in the art will appreciate that various modifications, additions, and substitutions are possible, without departing from the scope and spirit of the disclosure. It is therefore intended that the foregoing description be regarded as illustrative rather than limiting, and that it be understood that all equivalents and/or combinations of embodiments and examples are intended to be included in this description.

Although certain parts, components, features, and methods of operation and use have been described herein in accordance with the teachings of the present disclosure, the scope of coverage of this patent is not limited thereto. On the contrary, this patent covers all embodiments of the teachings of the disclosure that fairly fall within the scope of permissible equivalents.

What is claimed is:

1. A bicycle derailleur comprising:
a base member mountable to a bicycle frame, wherein the base member comprises:
first and second laterally spaced mounting portions defining first and second parallel planes defining a space therebetween, wherein the space is dimensioned to receive a portion of the bicycle frame, and wherein the first and second mounting portions define a laterally extending first rotation axis, and the base member is configured to be rotatable about the first rotation axis;
a front face comprising:
a first mounting arrangement defining a first pivot axis oriented at an acute angle relative to the first and second planes;
a second mounting arrangement defining a second pivot axis parallel to the first pivot axis; and
a cavity defined rearwardly of the first and second mounting arrangements, the cavity having a top surface oriented at an acute angle relative to the first and second planes;
a first link pivotally connected to the first mounting arrangement;
a second link pivotally connected to the second mounting arrangement,
wherein at least one of the first and second links comprises a first end portion moveable in the cavity as the first and second links are pivoted relative to the first and second mounting arrangements; and
a moveable member pivotally connected to the first and second links.

2. The bicycle derailleur of claim 1 wherein the moveable member comprises an electric motor.

3. The bicycle derailleur of claim 2 wherein the first and second mounting arrangements are defined on a front face of the base member, and further comprising a battery connected to a rear face of the base member, wherein the battery is electrically coupled to the electric motor.

4. The bicycle derailleur of claim 3 wherein the base member comprises a passage extending between the front and rear faces, and further comprising a wire electrically connected between the battery and the electric motor, wherein the wire extends through the passage.

5. The bicycle derailleur of claim 3 wherein the first and second mounting portions comprise first and second arms respectively, wherein the first and second arms comprise first and second inner surfaces respectively defining the first and second planes.

6. The bicycle derailleur of claim 5 wherein the battery comprises a center of gravity disposed between the first and second planes.

7. The bicycle derailleur of claim 6 wherein the first and second arms have predetermined first and second lengths sufficient to permit rotation of the base member around the first rotation axis, and wherein the space between the first and second mounting portions comprises a volume having a perimeter shaped to match an outer perimeter of the bicycle frame, and wherein the battery has an upper surface positioned outside the volume.

8. The bicycle derailleur of claim 1 further comprising a washer coaxially and rotatably mounted with the first mounting portion, wherein one of the first mounting portion or the washer comprises a first stop, and the other of the first mounting portion or the washer comprises a second stop, wherein the first mounting portion is rotatable relative to the washer between an engaged position wherein the first stop is engaged with the second stop and a disengaged position wherein the first stop is disengaged from the second stop.

9. The bicycle derailleur of claim 5 wherein the base member comprises a front face, wherein the first and second mounting arrangements are positioned on the front face, wherein the first and second links are pivotally connected to the first and second mounting arrangements with first and second axles respectively, and wherein at least a portion of the each of the first and second axles are disposed between the first and second planes.

10. The bicycle derailleur of claim 9 wherein the front face comprises a cavity positioned rearwardly of the first and second mounting arrangements, wherein at least one of the first and second links comprise a first end portion moveable in the cavity as the first and second links are pivotable relative to the first and second mounting arrangements.

11. The bicycle derailleur of claim 10 wherein the front face further comprises a slanted surface communicating with one side of the cavity.

12. The bicycle derailleur of claim 10 further comprising a platform disposed adjacent the cavity, and a spring having a first portion engaging the platform and a second portion engaging one of the first or second links.

13. The bicycle derailleur of claim 1 wherein the first pivot axis is oriented at an angle of 45 degrees relative to the first and second planes.

14. A bicycle derailleur comprising:
a base member mountable to a bicycle frame, wherein the base member comprises:
first and second laterally spaced mounting portions defining first and second parallel planes defining a space therebetween, wherein the space is dimensioned to receive a portion of the bicycle frame, and wherein the first and second mounting portions define a laterally extending first rotation axis, and the base member is configured to be rotatable about the first rotation axis;
a front face comprising:

a first mounting arrangement defining a first pivot axis oriented at an acute angle relative to the first and second planes;

a second mounting arrangement defining a second pivot axis parallel to the first pivot axis; and a cavity defined rearwardly of the first and second mounting arrangements, the cavity having a top surface formed parallel the first pivot axes and the second pivot axes, the top surface being oriented at an acute angle relative to the centerline of the battery mount;

a rear face comprising a battery mount having a centerline disposed between and parallel to the first and second planes; and a passage extending between the front and rear face;

a first link pivotally connected to the first mounting arrangement;

a second link pivotally connected to the second mounting arrangement, wherein at least one of the first and second links comprises a first end portion moveable in the cavity as the first and second links are pivoted relative to the first and second mounting arrangements;

a moveable member pivotally connected to the first and second links, wherein the moveable member comprises an electric motor; and a wire electrically connecting the battery mount and the electric motor, wherein the wire is disposed in the passage.

15. The bicycle derailleur of claim 14 further comprising a battery electrically connected to the battery mount, wherein the battery is electrically coupled to the electric motor with the wire.

16. The bicycle derailleur of claim 15 wherein the battery comprises a center of gravity disposed between the first and second planes.

17. The bicycle derailleur of claim 15 wherein the first and second mounting portions comprise first and second arms respectively having predetermined first and second lengths sufficient to permit rotation of the base member around the first rotation axis, and wherein the space between the first and second mounting portions comprises a volume having a perimeter shaped to match an outer perimeter of the bicycle frame, and wherein the battery has an upper surface positioned outside the volume.

18. The bicycle derailleur of claim 14 wherein the first and second links are connected to the first and second mounting arrangements with first and second axles, and wherein at least a portion of the each of the first and second axles are disposed between the first and second planes.

19. A bicycle derailleur comprising:

a base member mountable to a bicycle frame, wherein the base member comprises:

first and second laterally spaced mounting portions defining first and second parallel planes defining a space therebetween, wherein the space is dimensioned to receive a portion of the bicycle frame, and wherein the first and second mounting portions define a laterally extending first rotation axis, and the base member is configured to be rotatable about the first rotation axis;

a front face comprising:

a first mounting arrangement defining a first pivot axis oriented at an acute angle relative to the first and second planes; and a second mounting arrangement defining a second pivot axis parallel to the first pivot axis; and a cavity defined rearwardly of the first and second mounting arrangements; and a rear face; and a first link pivotally connected to the first mounting arrangement;

a second link pivotally connected to the second mounting arrangement, wherein at least one of the first and second links comprises a first end portion moveable in the cavity as the first and second links are pivoted relative to the first and second mounting arrangements; and a moveable member pivotally connected to the first and second links.

20. The bicycle derailleur of claim 1, further comprising:

a bottom face having a first portion and a second portion, the first portion of the bottom face oriented perpendicular to the pivot axes, and the second portion of the bottom face oriented parallel to the pivot axes.

21. The bicycle derailleur of claim 1, wherein the top surface of the cavity is formed parallel the first pivot axes and the second pivot axes, and wherein the cavity additionally includes two sidewalls and a bottom wall.

* * * * *